United States Patent
Klingman

[11] Patent Number: 6,021,453
[45] Date of Patent: Feb. 1, 2000

[54] MICROPROCESSOR UNIT FOR USE IN AN INDEFINITELY EXTENSIBLE CHAIN OF PROCESSORS WITH SELF-PROPAGATION OF CODE AND DATA FROM THE HOST END, SELF-DETERMINATION OF CHAIN LENGTH AND ID, (AND WITH MULTIPLE ORTHOGONAL CHANNELS AND COORDINATION PORTS)

[76] Inventor: Edwin E. Klingman, 3000 Highway 84, San Gregorio, Calif. 94074

[21] Appl. No.: 08/925,991

[22] Filed: Sep. 9, 1997

Related U.S. Application Data

[63] Continuation-in-part of application No. 08/846,118, Apr. 24, 1997, Pat. No. 5,860,021.

[51] Int. Cl.[7] .............................. G06F 13/37; G06F 13/42
[52] U.S. Cl. ........................... 710/129; 710/131; 710/38; 712/11; 712/16; 712/29
[58] Field of Search .................................. 395/306–309, 395/311, 284, 285, 287, 825, 856, 858, 868, 740, 741; 709/201–202; 712/10, 11, 16, 18, 28, 29, 32

[56] References Cited

U.S. PATENT DOCUMENTS

| | | | |
|---|---|---|---|
| 4,533,993 | 8/1985 | McCanny et al. | 712/28 |
| 5,151,996 | 9/1992 | Hillis | 712/16 |
| 5,291,609 | 3/1994 | Herz | 395/726 |
| 5,687,346 | 11/1997 | Shinohara | 395/430 |
| 5,710,932 | 1/1998 | Hamanaka et al. | 712/11 |
| 5,754,792 | 5/1998 | Shutoh et al. | 709/243 |
| 5,790,879 | 8/1998 | Wu | 712/18 |
| 5,801,715 | 9/1998 | Norman | 345/505 |
| 5,802,325 | 9/1998 | Le Roux | 395/282 |
| 5,822,548 | 10/1998 | Story et al. | 395/286 |
| 5,822,608 | 10/1998 | Dieffenderfer et al. | 712/11 |
| 5,832,245 | 11/1998 | Gulick | 395/309 |

*Primary Examiner*—Ayaz R. Sheikh
*Assistant Examiner*—Raymond N Phan
*Attorney, Agent, or Firm*—Claude A. S. Hamrick; Oppenheimer Wolff & Donnelly

[57] ABSTRACT

A novel architecture is based on a general purpose microcomputer with an "upstream" bus and a "downstream" bus. The upstream bus interfaces to an integrated multiport RAM that is shared between an upstream processor and the local processor, and possesses both upstream and local (downstream) interrupts associated with dedicated locations in RAM. The upstream bus can be operated in two modes, a standard (EISA) PC bus MASTER mode in which the dual port RAM is compatible with an IBM PC bus and a SLAVE mode in which the upstream bus is compatible with the downstream bus. An indefinitely long chain of such processors can be initialized by one host. Orthogonal channels (decoupled from the main upstream/downstream bus) can be used to achieve unique functionality based on host control of arrays of such processors.

48 Claims, 12 Drawing Sheets

A. ACTIVE (INTERRUPT) PARALLEL ACCESS

B. PASSIVE (POLLED) PARALLEL ACCESS

C. ACTIVE (INTERRUPT) SERIAL ACCESS

UPSTREAM COMMUNICATION METHODS

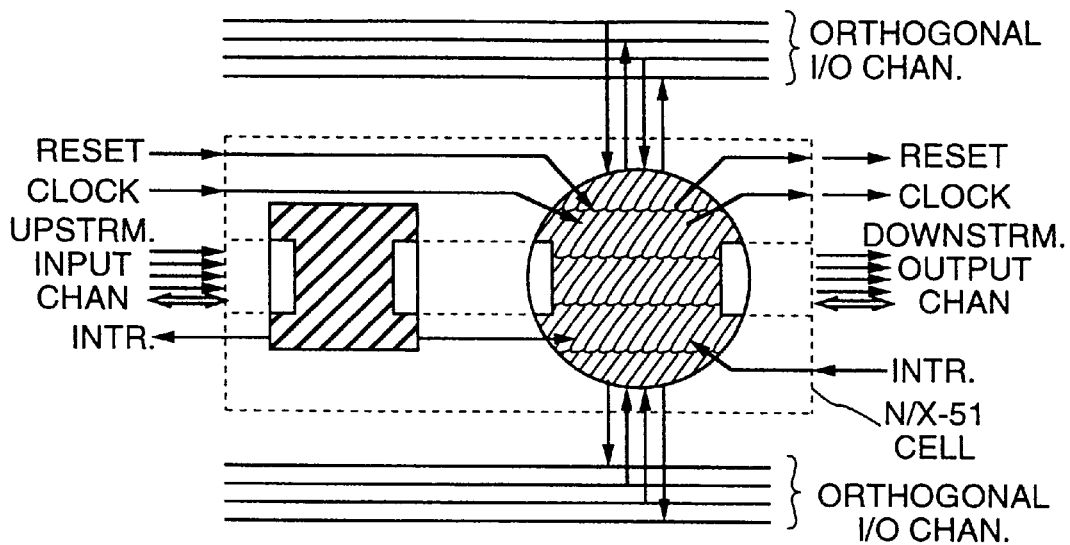
FIG. 22
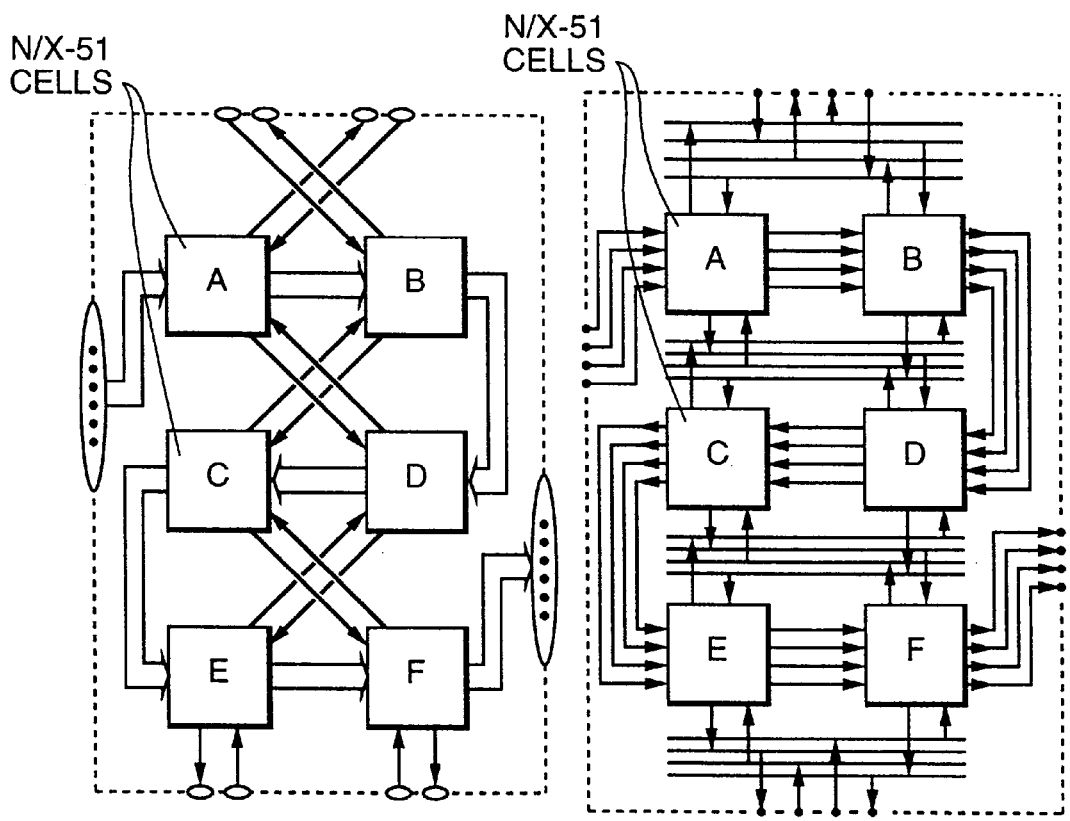
FIG. 23a  FIG. 23b

MICROPROCESSOR UNIT FOR USE IN AN INDEFINITELY EXTENSIBLE CHAIN OF PROCESSORS WITH SELF-PROPAGATION OF CODE AND DATA FROM THE HOST END, SELF-DETERMINATION OF CHAIN LENGTH AND ID, (AND WITH MULTIPLE ORTHOGONAL CHANNELS AND COORDINATION PORTS)

CROSS REFERENCE TO RELATED APPLICATION

This application is a continuation-in-part of my prior application Ser. No. 08/846,118, filed Apr. 24, 1997, entitled "A SINGLE CHIP MICROCONTROLLER HAVING DOWN-LOADABLE MEMORY ORGANIZATION SUPPORTING "SHADOW" PERSONALITY, OPTIMIZED FOR BI-DIRECTIONAL DATA TRANSFERS OVER A COMMUNICATION CHANNEL", now U.S. Pat. No. 5,860,021.

BACKGROUND OF THE INVENTION

1. Field of the Invention

This invention relates to the field of general purpose microcomputers and particularly to a microcomputer unit configured such that a plurality thereof can be sequentially coupled together to form a chain of signal processing units each including a local processor and an associated multiport RAM that can be shared between a neighboring "upstream" unit's processor and its own local processor. The chain of such processors can be initialized by a host computer that downloads code that is sequentially transferred from unit to unit and used to perform processing of orthogonal channel data that may be uniquely related to each unit but relationally associated with at least some of the other units.

2. Description of the Prior Art

There are important computational problems that involve multiple (n) processes and approximate a "chain" of linked processes, with mostly "nearest neighbor" dependencies. Examples of such are DNA and Protein Models and polymer analysis. While these processes can be modeled on a single processor, the computational load tends to grow as $n^2$.

It would be useful to have an architecture that could more expeditiously deal with this type of issue. Such architecture would have additional usefulness in exercising economic models, stock market models, ecology models, digital circuit simulation, neural networks, image encoding, encryption, Markov processes, weather models, tree searches (such as gene sequences, finger prints, etc.), and models particular to other fields of application, some of which may find special purposes for orthogonal channels.

The utility of such architecture can be demonstrated in terms of linear polymer chains. However, the choice of such problem is not meant to imply any limitation or inapplicability of a particular type of processor to other "many body" problems, including artificial many body topics such as finite element analysis, in which one body is treated as many segments.

For example, digital gate simulation problems grow as the number of gates on a single chip grows. According to *Electronic Engineering Times*, Apr. 14, 1997, p. 18: "The largest system the DOD is targeting involves 9000 (Intel) Pentium Pros. Their goal is to handle a billion gate design". Because the architecture implemented in such processing devices as the Intel 8051 should be one to two orders of magnitude less expensive than Pentium based multi-processors, it is expected that such systems might have application here.

According to "Molecular Modeling" in Science, Vol 273, 6 Sep. 1996: "Most of the familiar depictions of DNA winding through space, and proteins and enzymes coming together, are created by means of x-ray crystallography.... it can take years before a researcher gets hold of the roughly "ten thousand numbers" that describe the shape of a protein molecule. These would be x, y, and z coordinates for a typical protein, which may contain 3000 atoms."

These years of work, if successful, culminate in "an electron density map of the molecule in question: a cube of numbers, often 64×64×64 with the numbers ranging from say, 0 to 100. This map can be imagined as a cloud in space with clumps where the big numbers are. That's where the electrons are, and by extension, the atoms."

The question of whether these years of work can be replaced by modeling is still unanswered, as indicated in Science Vol 274, 29 Nov. 1996, wherein the question is proffered: "... can researchers who model protein structure make accurate predictions before a structure is determined by experiment?"

Prior art generally falls into two categories. The first category includes general purpose processors, which are employed in large numbers to solve particular problems. The 9000 Pentium Pro system from Intel illustrates an example of such systems although it has yet not been built.

The primary problem with arrays of general purpose processors is cost. The Department of Defense can afford 9000 Pentium Pros, but few others can.

The other category consists of very simple processors, many of which may be implemented on a single substrate, and which are often optimized for special applications.

The primary problem with arrays of special purpose (or single-substrate)processors is difficulty of programming and inflexibility. These solutions also tend to be expensive, due to the very limited market for them. Results have been disappointing for prior art of this type, both commercially, and in terms of problem solving. Integrated arrays of extremely simple boolean operators—while lightning fast, are hard to program, that is, it is hard to map real world phenomena into simple boolean arrays.

An intermediate approach was taken by Inmos, in their "Transputer". A somewhat general, but proprietary instruction set, was coupled with high speed serial channels, to provide powerful multi-processor arrays. These suffered from difficulty of programming, although Inmos did provide a high level language called Occam. Most commercial Transputer implementations have been limited to four processors per board, with board prices in the thousands of dollars.

The evolution of single chip computers offers the ability to economically apply large numbers of processors to this problem, however the typical micro controller has not been designed with this problem in mind, and the noted lack of success in the commercial market has tended to suppress activity in this field. Yet the need for protein, DNA, and similar calculations has grown enormously. At the same time line widths have shrunk die sizes significantly, decreasing the inherent cost of the devices.

SUMMARY OF THE INVENTION

The present invention represents a new architectural approach to solving the problems mentioned above. The invention provides a computational unit based on the use of a "standard" instruction set with extensions chosen to support n-body "chains". In addition to bit serial communications, byte wide memory access is provided. Instead of full bidirectional symmetry, the chain is caused to have a "preferred" direction. This may be thought of as analogous to the unidirectional replication of DNA chains. The architecture used in the presently preferred embodiment of the present invention (hereinafter referred to as the N/X-51 architecture) is an improvement of the single chip processor unit design described in applicants' pending U.S. patent application Ser. No. 08/846,118 filed Apr. 24, 1997 and entitled "A SINGLE CHIP MICROCONTROLLER HAVING DOWN-LOADABLE MEMORY ORGANIZATION SUPPORTING "SHADOW" PERSONALITY, OPTIMIZED FOR BI-DIRECTIONAL DATA TRANSFERS OVER A COMMUNICATION CHANNEL", now U.S. Pat. No. 5,860,021. The patent disclosure is expressly incorporated herein by reference.

An important advantage of the present invention is that it provides a microprocessor unit that can be directly connected to other like units and used to evaluate various types of linked processes involving nearest neighbor dependencies.

Another advantage of the present invention is that it makes practical the interlinking of an array of microprocessing units to substantially reduce the computational load on a host computer conducting multiple interlinked variable modeling.

These and other advantages of the present invention will no doubt become apparent to those skilled in the art after having read the following disclosure which makes reference to the several figures of the drawing.

IN THE DRAWINGS

FIG. 22 is a diagram illustrating how discrete integrated circuit microprocessor unit cells would be linked together into a regular chain topology;

FIG. 23a is a diagram illustrating a 6-cell implementation of N/X-51 cells with a typical orthogonal I/O channel interconnection scheme; and FIG. 23b illustrates the implementation of FIG. 23a in a quasi-schematic form.

DESCRIPTION OF THE PREFERRED EMBODIMENTS

In a linear chain the communication direction is from a host downstream through the chain as described below. There should also be a means to communicate in the direction of the host. The architecture of the present invention supports several such means. Passive means are based on Polling, that is, the "downstream" processor (remote from the host) simply puts relevant information into a specific location in memory, and the "upstream" processor (nearer to the host) polls this location as appropriate. Active means include "upstream interrupt" capability, and also upstream serial communication channel(s).

Figure 1:
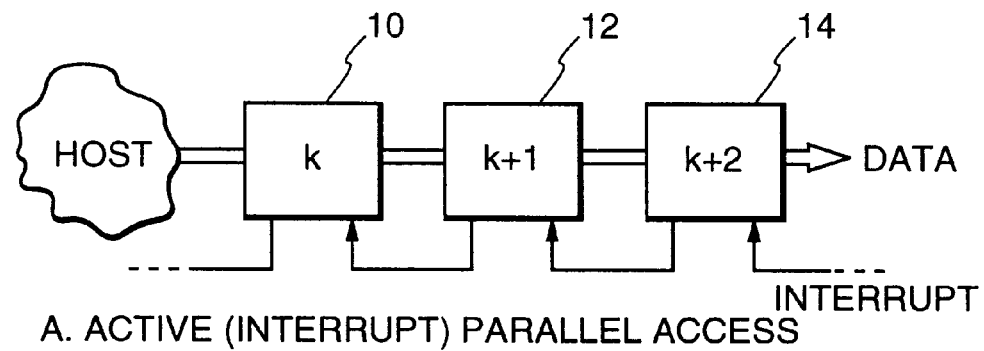
FIG. 1 is a diagram illustrating three types of upstream communication methods.
Figure 1:
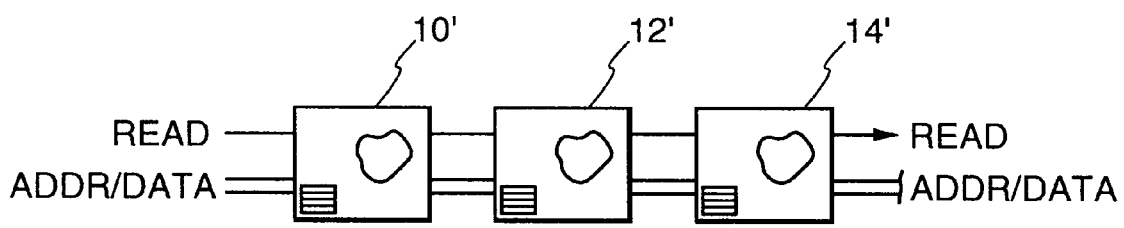
Figure 1:
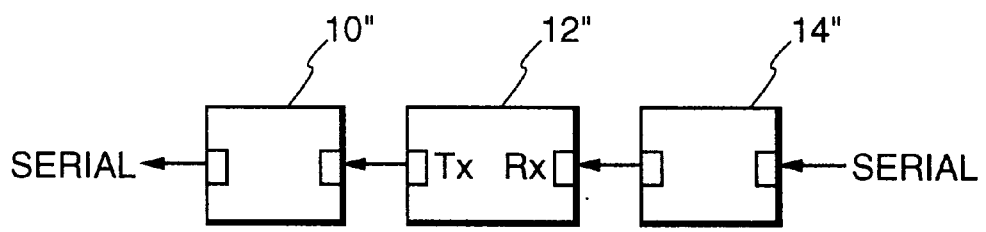

As representationally shown in FIG. 1 of the drawing, upstream communication between linked processing 10, 12 and 14 can be active or passive, with parallel or serial access. Serial access is via UART, in which the TxD line is connected to the upstream device, while RxD is connected to the downstream device. Parallel access is via a dual port RAM as described in the above-referenced patent application.

Figure 2:
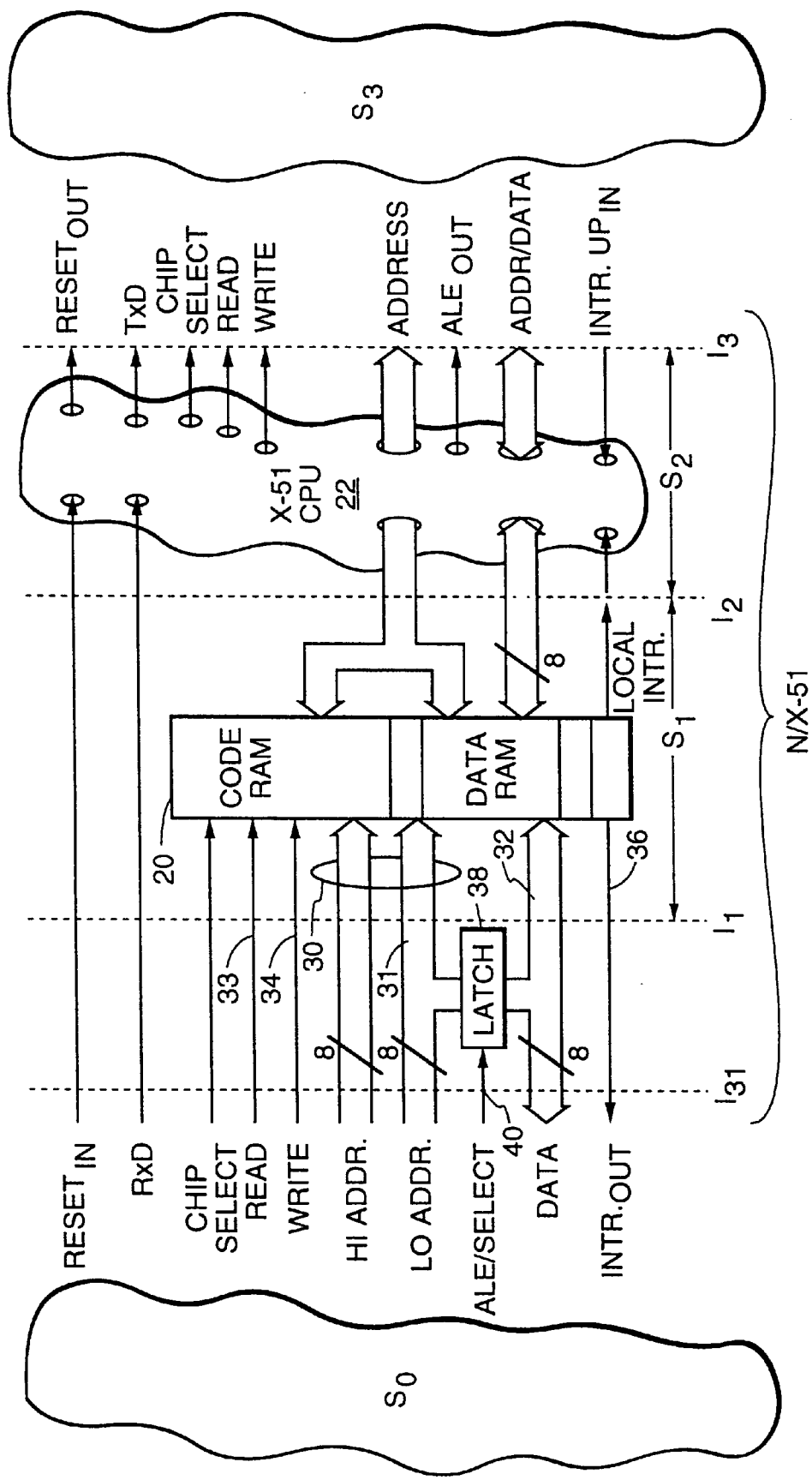
FIG. 2 is a simplified diagram illustrating the principal components of a microprocessor unit in accordance with the present invention.

In FIG. 2 a simplified schematic diagram is presented disclosing the principal functional component of an improved microprocessor unit (hereinafter referred to as an "N/X-51 unit") in accordance with the present invention. The N/X-51 unit has two major subsystems $S_1$ and $S_2$, with three major interfaces $I_1$, $I_2$ and $I_3$, and a new interface $I_3$. Subsystem $S_1$ consists of a dual port RAM 20 as described in the copending Klingman application. Subsystem $S_2$ consists of a CPU 22 capable of executing instructions obtained from $S_1$, and the illustrated embodiment is of Harvard X-51 architecture referred to herein generally as an X-51 CPU. Interface $I_1$ describes the external address, data, and control properties that, in the embodiment disclosed in the above-referenced application, connect subsystem $S_1$ to a host, or "upstream" subsystem $S_0$. However, in this embodiment an additional interface $I_{31}$ is also included as will be explained below. Interface $I_2$ describes the internal address, data, and control busses/properties that connect the dual port RAM memory subsystem $S_1$ to the CPU 22 (subsystem $S_2$). Interface $I_3$ describes the external address, data, and control busses that connect the CPU subsystem $S_2$ to a "downstream" device, subsystem $S_3$.

In FIG. 2 the PnP component and the CODE ROM components disclosed in the above-referenced application are ignored for simplicity. It will be appreciated that the host supplies 16-bit wide addresses to shared RAM and performs eight-bit data access to shared RAM. The local processor 22 also accesses byte-wide data via 16-bit addresses. As shown, coincident writes to the same location are resolved in favor of the host. The X-51 architecture does not support wait states, therefore software should avoid simultaneous writes to the same location in shared RAM, via semaphores if necessary.

The dual port shared RAM architecture $S_1$ uses two bytes of memory as interrupt subsystems, which generate interrupts to the "opposite" side when written to by either side, and clears the interrupts when read by the "opposite" side. This mechanism is ideal for the upstream interrupt configuration shown in FIG. 1a, and also performs downstream interrupts as well. The meaning of the interrupt is coded in the actual byte written to the interrupting location.

The host can read any byte in shared RAM independently of the state of the local processor. This provides the passive poll'ed method of upstream communication. The local processor can write an appropriate value to a particular location at any time. The host can read this value by polling the particular location and can interpret the value as appropriate.

Details disclosed in the copending Klingman patent having to do with the X-51 CPU architecture, which are optional for purposes of this invention are suppressed in FIG. 2 for simplicity, and emphasis is placed on address, data, and interrupt bus details. Details relating to the address comparator and WAIT signal to the host, as well as the CODE ROM are also not illustrated herein.

The external (upstream) interface $I_1$ is chosen to be an (E)ISA interface, for compatibility with the hundred million or so IBM PC clones in the market.

The external (downstream) interface $I_3$ is chosen to be the Intel 8051 microcomputer (uC) interface, probably the most common interface for peripheral devices such as the Siemens 2085 ISDN Subscriber Access Circuit. The interface $I_3$ is described in the Intel 8051 Design Manual.

The internal interface $I_2$ may be generally described as a 16 bit address bus, an eight bit data bus, and a control bus consisting of CODE/DATA* RAM select, Read and Write strobes (not shown), all of which are applied to the dual port RAM, and an interrupt signal from the dual port RAM. The details of the address and data busses are not as significant, since they are internal and may be implementation specific.

The above description generally summarizes the downloadable memory organization described by the referenced Klingman patent, although the "shadow ROM", the RAM*/ROM select line, or the behavior while reset, and any ISDN-related features are not discussed. Other significant signals, specifically Reset, and Chip Select (CS), will be discussed later.

Of particular interest is a subset of the EISA bus, consisting of a 16-bit address bus 30, an eight bit data bus 32, read and write strobes 33, 34, all applied to the dual port RAM subsystem $S_1$, and an interrupt signal applied on line 36 from $S_1$ to the upstream subsystem (or host) $S_0$. This interface is to be made congruent with the i8051 uC bus consisting of an eight bit address bus, an eight bit multiplexed address and data bus, an ALE (address latch enable) signal, Read and Write strobes, and an interrupt signal.

The system has a directionality, as indicated by the terms upstream and downstream. Normally the $I_1$ interface receives addresses from the upstream device (the host) while the $I_3$ interface presents addresses to a downstream device (the peripheral). If $I_1$ can be made congruent to $I_3$, then an identical unit can effectively be operated as a peripheral, thereby extending the architecture in a novel fashion, and, with other features, to be described later, enabling a significant set of new behaviors with potentially great utility. A goal is to present a sixteen bit address to the dual port RAM subsystem $S_1$ regardless of whether the EISA or the uC interface is selected. The EISA sixteen bit address is equivalent to a high eight bit address bus and a low eight bit address bus, when the most significant address bits appear on the high address bus and the least significant address bits on the low address bus.

In accordance with the present invention, additional interface $I_{31}$ including latch circuitry 38 is added, capable of selectively altering interface $I_1$ to force interface $I_1$ into congruence with interface $I_3$. An additional signal, the EISA/uC* (ALE-in) signal input at 40 will select the mode of the upstream interface $I_1$. If EISA/uC is low, the EISA mode of operation will be selected. If high, the uC mode will be selected.

The new interface, $I_{31}$ is congruent with both $I_3$ and $I_1$. If the $I_1$ input mode is selected (ALE/Select=0) then the eight bit latch 38 outputs 1s onto the low address bus 31, which are overridden by the eight least significant address bits applied to the low address bus input. (There are several equivalent ways to achieve this functionality using tri-state latch outputs, etc.)

Figure 3:
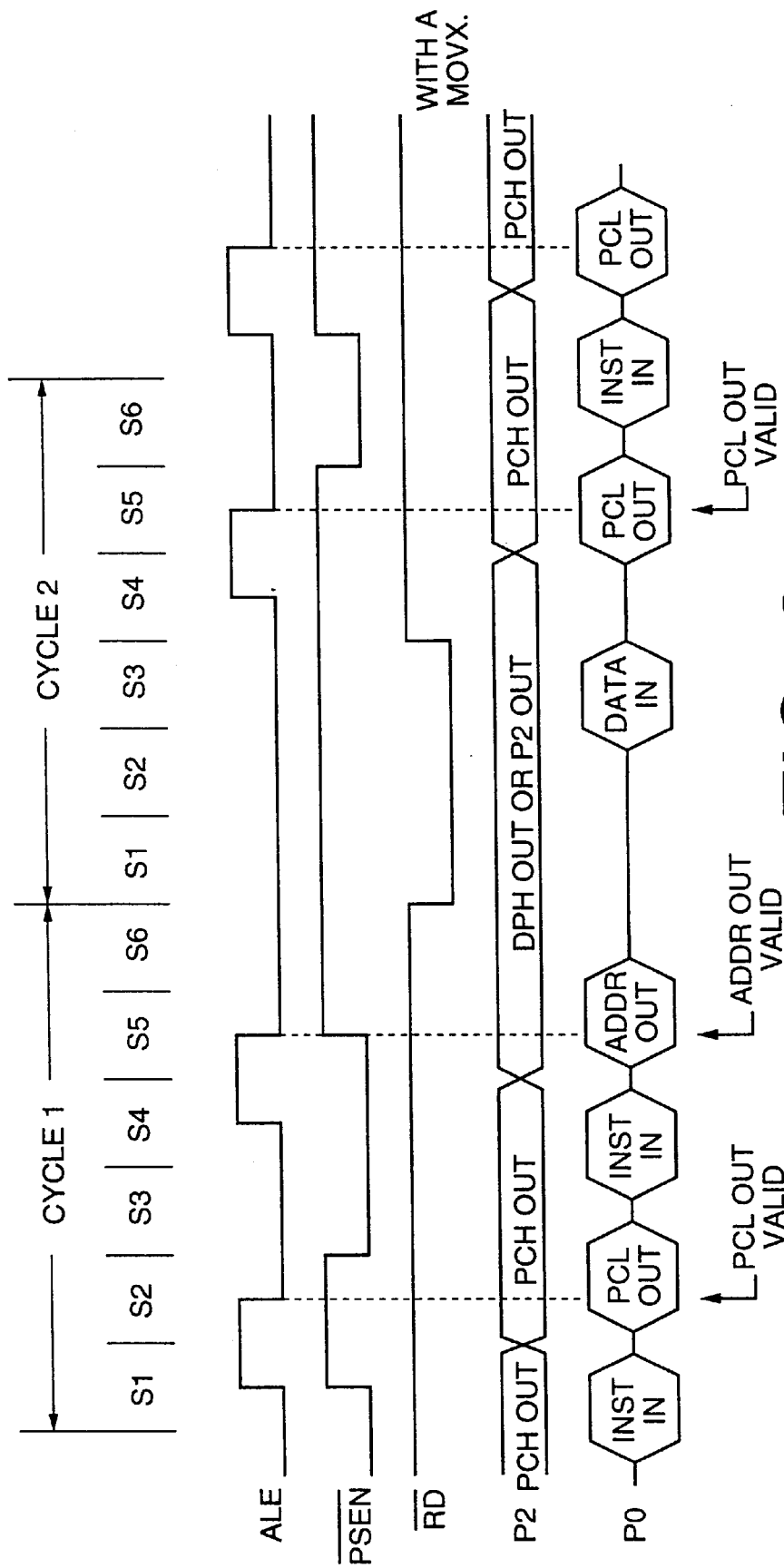
FIG. 3 is a timing diagram useful in understanding operations of the present invention.

If the $I_3$ congruent interface is selected, then the low address bus pins are unused, and they will electrically "float" high (via pullup resisters). The ALE signal from the $I_3$ interface latches the contents of the data bus onto the low address bus, thereby overriding the unused pins and forcing the least significant address bits onto the low address bus. The address is latched on the falling edge of ALE as shown in FIG. 3, then the data appears on the data bus. FIG. 3 is a timing diagram showing bus cycles in Intel 8051 Devices executing from External Prog Memory and is taken from Intel's "MCS-51 Microcontroller Family User's Manual" page 1–19, February 1994.

Figure 4:
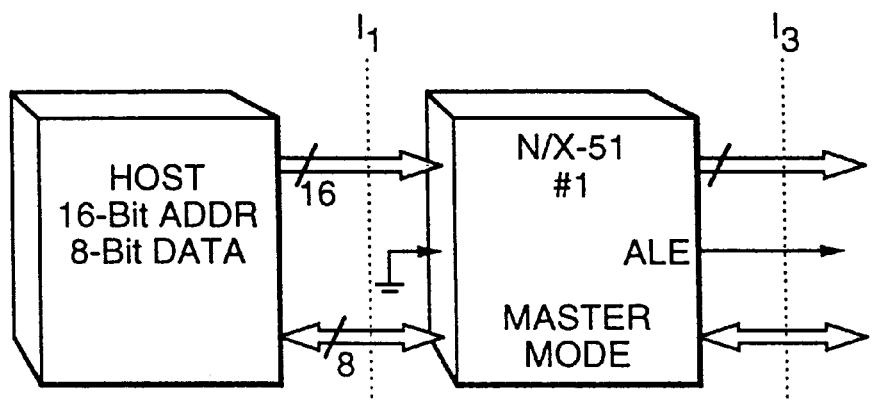
FIGS. 4 and 5 are diagrams illustrating MASTER and SLAVE modes in accordance with the present invention.
Figure 5:
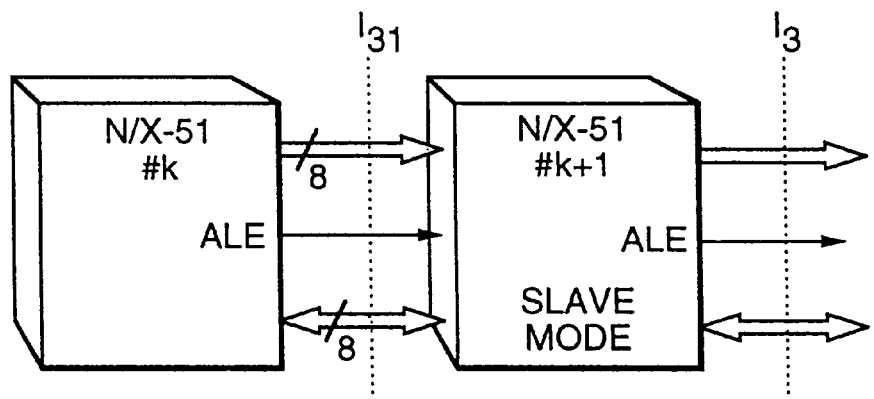
Figure 6:
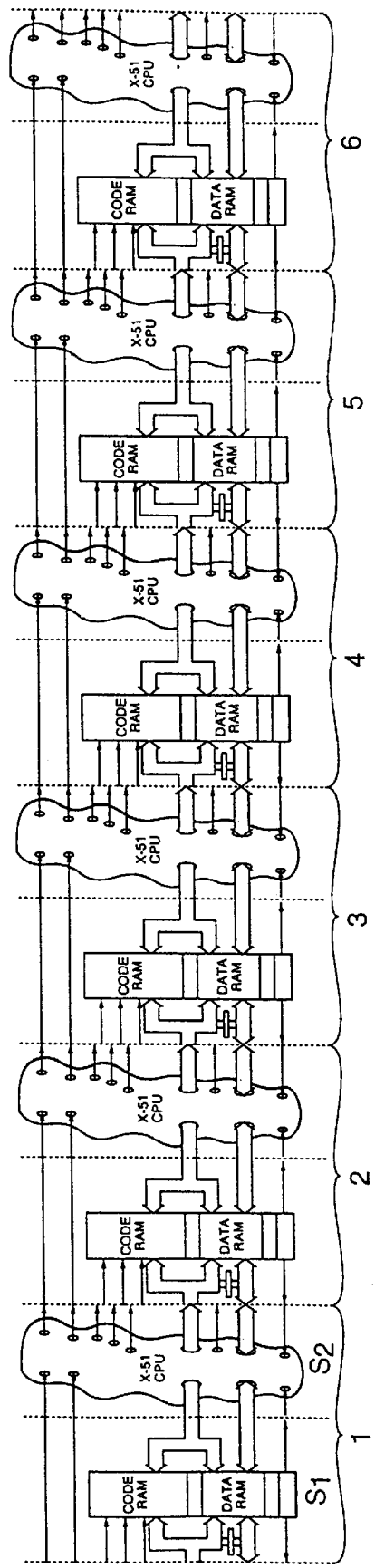
FIG. 6 illustrates a chain connection of 6 SLAVE units in accordance with the present invention.

FIGS. 4 and 5 illustrate both N/X-51 unit modes: MASTER and SLAVE. It can be seen that either the MASTER is the only N/X-51 unit in a system, or it is the "most upstream" N/X-51 unit. Since an N/X-51 unit in the SLAVE mode looks like a peripheral device and each N/X-51 unit can drive a peripheral device, then each SLAVE N/X-51 can control a next SLAVE N/X-51, and this configuration can be repeated indefinitely. Thus a means has been established of indefinitely extending a chain of SLAVE processors, with no inherent limit to the length of the chain. An example of such a chain of six SLAVE units is depicted in FIG. 6.

Each dual port RAM subsystem $S_1$ is capable of producing both an "upstream interrupt" to the host or an upstream N/X-51 unit and a "downstream interrupt" from the host or an upstream N/X-51 unit to the "current" X-51 subsystem $S_2$. Therefore, in a preferred implementation, an upstream device interrupts a downstream device by writing to locate 0×7FF, while a downstream device interrupts an upstream device by writing to location 0×7FE. This provides for immediate interrupt based communications up and down the chain of processors. This does not preclude either POLLed or SERIAL communications upstream and downstream, and, is compatible with both POLLed and SERIAL communications along or across the chain. The N/X-51 n-Body Architecture includes the integration of a processor unit with a dual port SRAM-based mailbox memory and appropriate bus interfaces to the dual port SRAM, with appropriate partitioning of memory subspaces and with external (upstream) access to memory while the processor is held in reset condition.

In Master mode, the IC possesses an ISA-bus interface with separate address and data paths as the "left" interface to the dual port RAM, while the "right" interface to the dual port RAM is internal to the IC. In addition, an 8051 multiplexed address/data bus is provided to control the "downstream" devices such as the Siemens 2186 ISDN interface component and sub-circuits, or any peripheral I/O devices using the 8051 microcomputer bus.

In the Slave mode, the "left" interface to the dual port RAM becomes an 8051 compatible multiplexed address/data bus, utilizing only eight (8) lines of the sixteen (16) line ISA address, and utilizing an "upstream" ALE-in signal line. If ALE-in low, use ISA-bus: (16-address, 8-data) If ALE-in is hi, use 8051-bus: (8-HiAddr, 8-LoAddr/data, ALE-in) where ALE is the Address-Latch-Enable signal that causes the low 8 bits of address to be latched off of the data bus.

The supported configuration will allow the following chain: (386)--|ISA|--(Master)--|uC|--(Slave)-|uC|--(Slave)--|uC|--(I/O) where (386) represents a PC-type processor, and (I/O) represents an I/O device such as the Siemens 2086, and --|bus|-- represents a bus across a specific interface, The ISA interface is represented as --|ISA|--and the 8051-microcomputer interface is represented as --|uC|--, while (Master) and (Slave) represent the N/X-51 unit in it's respective modes.

Either bus, the ISA bus or the uC bus, should be capable of writing into RAM while the 8051-processor is held in reset.

Consider first the case in which no host processor exists. In this case the X-51 code is assumed to reside in the "shadow" ROM (See referenced Klingman patent). The ROM is selected at startup via the ROM/RAM* selection pin, and execution proceeds from ROM location zero. If multiple N/X-51 units are connected as a chain as depicted in FIG. 6, each unit will begin executing its own code ROM when released from reset. Communication along the chain will be determined by the code in ROM.

This scenario is the simplest, but, with appropriate CODE in ROM, offers novel computational abilities. The more general case assumes the presence of a host processor that downloads code to the Master N/X-51 unit (#1) while the unit is held in Reset condition, and causes the ROM/RAM* line to select CODE RAM when the unit is released from Reset condition. The first unit then begins executing the code downloaded from the host.

In order to extend this case, we note that the X-51 of unit 1 is reset by a high signal on the RESET line. Note also that all X-51 I/O lines are forced high when the X-51 is reset. Thus, if the RESET lines are "daisy chained" by specifying that the RESET line of a "downstream" X-51 is controlled by an I/O line of an "upstream" unit, then the MASTER or "farthest upstream" unit will determine the Reset condition as follows.

The CPU of the MASTER N/X-51 is reset ( by any means) and all of it's I/O lines are driven high. According to the assumption, one of these I/O lines is connected to the RESET pin of the next downstream X-51, and each unit will therefore be forced into Reset, ad infinitum. Thus, the initial state of the chain of N/X-51 units is completely determined, regardless of the length of the chain.

Having placed the chain into a known initial state, the question is raised, what occurs when the MASTER N/X-51 unit is released from Reset. In general, only the following can be predicted: Release of the MASTER unit from the Reset condition does not imply release of any SLAVE unit from Reset, and, in fact, all SLAVE units will remain in Reset condition until the MASTER unit executes an I/O instruction specifically lowering the I/O line that is attached to the RESET pin of the next downstream X-51.

To specify any further behavior some assumption must be made concerning the code executed by the CPU of each unit. To now consider one of the more interesting schemes, assume that an X-51 program has been written to accomplish the scheme. Assume that the host is used to download the program into the CODE RAM of the MASTER unit's X-51 while it is held in Reset condition. Assume further that the code causes the MASTER unit's X-51 to copy the code from it's own code RAM to the CODE RAM of the next downstream unit before releasing the next downstream X-51 from Reset.

If "n" units are assumed to be in the chain, beginning with MASTER unit #1 and terminating with SLAVE unit n, the procedure is as follows:

1. Host loads unit #1 and releases reset.
2. Unit #1 copies "self" code to unit #2 and releases reset.
K+1. Unit #K copies "self" code to unit #K+1 and releases reset.

Figure 7:
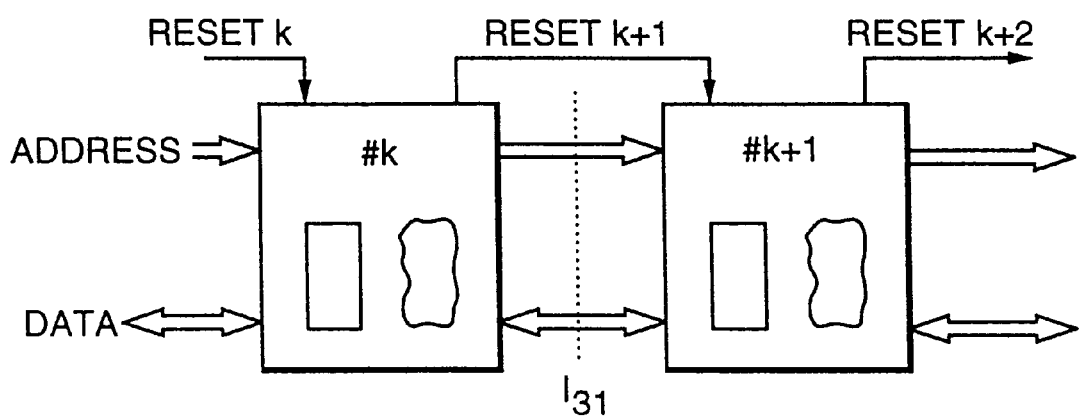
FIG. 7 illustrates operation across the $I_{31}$ interface in accordance with the present invention.

In FIG. 7 a unit #K is loaded with a copy of the desired code, and then released from Reset. The code causes the address presented to the $I_{31}$ interface to access CODE RAM of the K+1st device, and the data bus is used to copy the code at the corresponding address in device K's code RAM into the code RAM of device #K+1.

Assume that the code executed by unit K causes an exact copy of itself to be loaded into unit K+1 before releasing device #K+1 from Reset condition by lowering the specific I/O line used to hold unit K+1 in Reset.

When unit #K+1 is released from Reset, it begins executing the code that was downloaded by unit #K. Since the code is an exact copy of that in unit #K, and since unit K and K+1 are assumed to be identical, then unit #K+1 will copy the contents of it's own code RAM into the code RAM of unit #K+2, then release unit #K+2 from Reset.

From the above it can be seen that: if K, then K+1. Since it is known that this is true for some K=1, then, by induction, it is true for all K.

Thus, an indefinitely extensible chain of processors has been provided, that is, a chain of indeterminate length.

This has obvious utility for modeling DNA and protein chains, which are exceedingly long.

Under very general conditions, a host such as an IBM PC clone (Pentium, etc.) can load X-51 code across an EISA bus into a MASTER N/X-51 unit while that MASTER unit and all downstream SLAVE units are held in Reset. Upon release from Reset, the MASTER unit's CPU simply copies it's own code to the next down stream SLAVE unit and releases the SLAVE unit from Reset. After this minimal function, the X-51 code is generally unrestricted, and can communicate via it's own dual port RAM with the host (or next upstream device) or via the dual port RAM of the next downstream unit. Thus, except for the above specified startup behavior, the X-51 code is completely unspecified and therefore can be considered general purpose enough to represent any system described or approximated via a linear chain.

Note that the above system functions as described for indefinitely long chains, and is completely independent (except for initial "per copy" propagation delays) of the actual length of the chain. In fact, no knowledge of the length exists at this point.

While this is a powerful feature (obviously more powerful than if it only worked for specific lengths) it can be assumed that there are applications in which, at a minimum, each device would need a unique identifier for any communication along the chain other than nearest neighbor communications.

A method must therefore be devised by which each device can establish it's own ID and also identify the length of the processor chain.

As before, assume that the host loads the CODE RAM of unit #1 and then releases unit #1 from reset. Assume further the host writes the number "1" into a specified location in unit #1's DATA RAM. Assume further that initialization code executed by unit #1 not only copies it's own CODE RAM to the CODE RAM of unit #2, but also reads the contents of it's specific DATA RAM, increments the value by one, and then writes the incremented value into the corresponding location in unit #2's DATA RAM.

In this fashion it can be seen that the initialization procedure both propagates the common code and counts the number of N/X-51 units in the chain, assigning each unit a unique ID equal to it's sequence number in the chain.

While this provides an ID for each unit in the chain, it does not provide each unit with knowledge of the length of the chain.

For the following, assume a particular I/O pin or other pin is tested at each device. Obvious pins are the downstream RESET output line or the upstream interrupt input as will be seen, however any general purpose I/O pin will do.

In the simplest case, simply tie the RESET pin of the last processor in the chain to ground. (Note: the units are assumed not to know how long the chain is. We, however, are assumed to know the length of the chain, and if not, then we are at least assumed to know which is the last device, that is, where the end of the chain is.)

Figure 8:
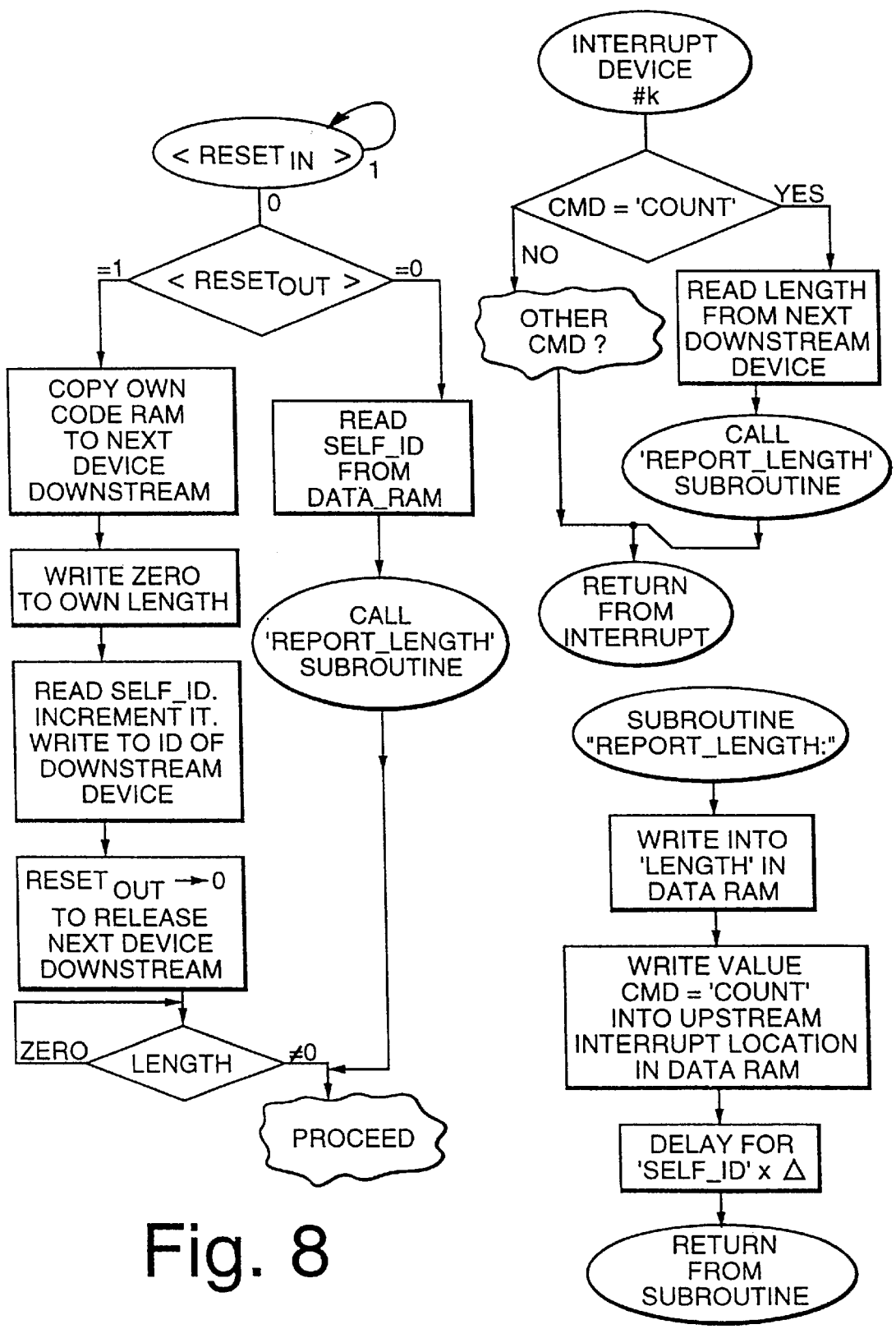
FIG. 8 depicts flow charts showing operational steps in the last unit ID return methodology of the present invention.

The pin test routine is illustrated by the flow charts in FIG. 8 which are believed to be self-explanatory. Suffice it to say that as the last unit n is reset and its RESET out line is tested, the detected ground state will cause the unit to read its ID from its data RAM and write such ID into a specified location of the upstream data RAM, then interrupt the upstream unit. This will cause the upstream unit to itself read the ID stored in its data RAM and write it into the specified location in the next upstream unit's data RAM, etc. This operation will continue until the ID of the last unit in the chain has been handed all the way back along the string of units to the MASTER unit which will then report same to the host. It will thus be appreciated that in accordance with the present invention a data processing unit has been provided that can be connected in series with a multiplicity of like units, and the resulting string of units will be able to perform a series of identical or other predetermined operations in a serial sequence. The string will also be capable of determining and reporting back to the host the length of the string.

Orthogonal Communication Channels

The N/X-51 units can also contain orthogonal communication channels. For example, the basic communication channel uses shared RAM with interrupt signaling up and down the chain. This may be viewed as a communication channel connecting the elements in the chain with direct connection to nearest neighbor elements, and cooperative connection to remote elements of the chain (via the cooperation of intervening elements in the chain). However, alternate "orthogonal" channels may also be achieved via other I/O or communication subsystems.

The X-51 possesses one or more bit serial communication channels based on the widely used RS-232 protocols or I²C protocols or both. The X-51 RS-232 port is a simple double buffered interrupt based RS-232 port with transmit and receive lines. Features such as adaptive baud rate, transmit and receive queues, Clear-To-Send (CTS) and Data Terminal Ready (DTR), etc., can be implemented via programming.

Figure 9:
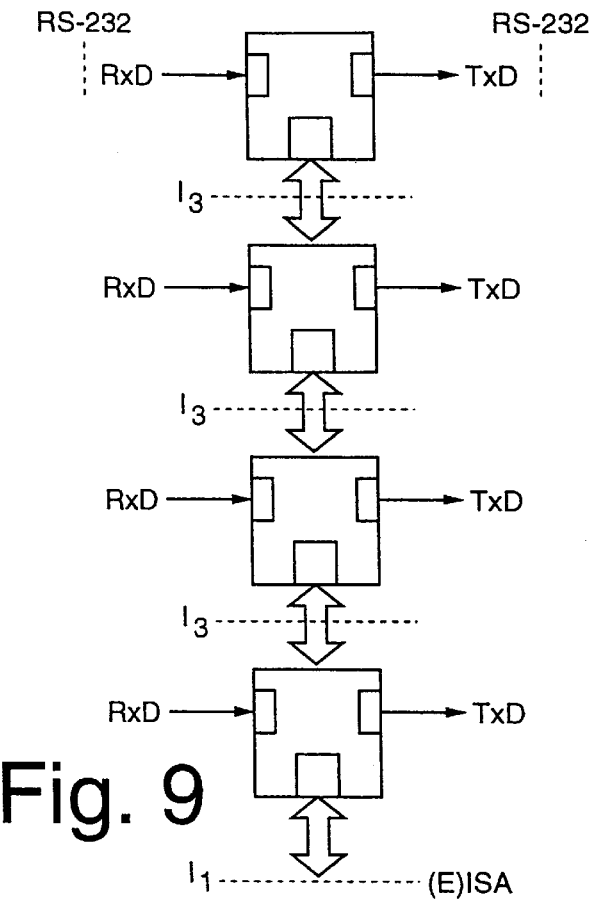
FIG. 9 is a simplified diagram showing I/O channels orthogonal to the main chain channel.

Referring now to FIG. 9, an illustration is provided showing that serial I/O channels in a string of N/X-51 units can be considered completely orthogonal to the "main chain channel".

For simplicity, the preferred implementation has one transmit line TxD, and one receive line RxD, and an interrupt associated with each. The RxD interrupt indicates a message unit (typically 7–8 bits) has been received (with proper framing, etc.) and is available in the RxD buffer. The TxD interrupt indicates that the transmit buffer is empty, and is available for the next message unit to send. Typical usage of such facilities involves load or unloading the relevant buffer in real time, during the execution of the interrupt service routine, then setting a "flag" or special bit to record the action, then returning from the interrupt. Only the message buffers and the flags will have changed, due to the interrupt. If these resources are set aside for use by TxD and RxD, then the interrupt is invisible to the interrupted program and therefore effectively orthogonal to said program.

Of course in practical applications one may not wish for complete decoupling between the different channels. Instead the channels may be viewed as existing in different "planes" or "spaces". In fact, in the preferred implementation, the channels may be assumed to operate on different "scales". Such an implementation is described below.

The Folding Problem in a Chain

Because the N/X-51 unit architecture strongly supports a chain of processors, it is designed to tackle problems which have chain topology in the real world; such as DNA and protein folding for example. In these polymer chains most forces are nearest neighbor, that is, any particular element normally depends most strongly on the nearest upstream element and the nearest downstream element. The inherent scale of the problem is basically a function of the average nearest neighbor distances. However, because the elements are not rigidly coupled, but allow some variation in angles, each particular couple may deviate somewhat from the direction established by the complementary couple.

It is this deviation that, over a number of elements, leads to folding, and, in fact, it is the folding, or tertiary structure of proteins and DNA that generally underlie the important (biological) behavior of the system.

Such folding is complex, and generally unpredictable, and provides the major reason for interest in computations that may be achieved with an N/X-51 unit chain.

From the perspective of a nearest neighbor model chain, the major consequence of folding is that elements which are initially distant from one another, and therefore independent of each other, may, through folding of the chain, be brought into close proximity, that is, into each others near neighborhood.

Figure 10:
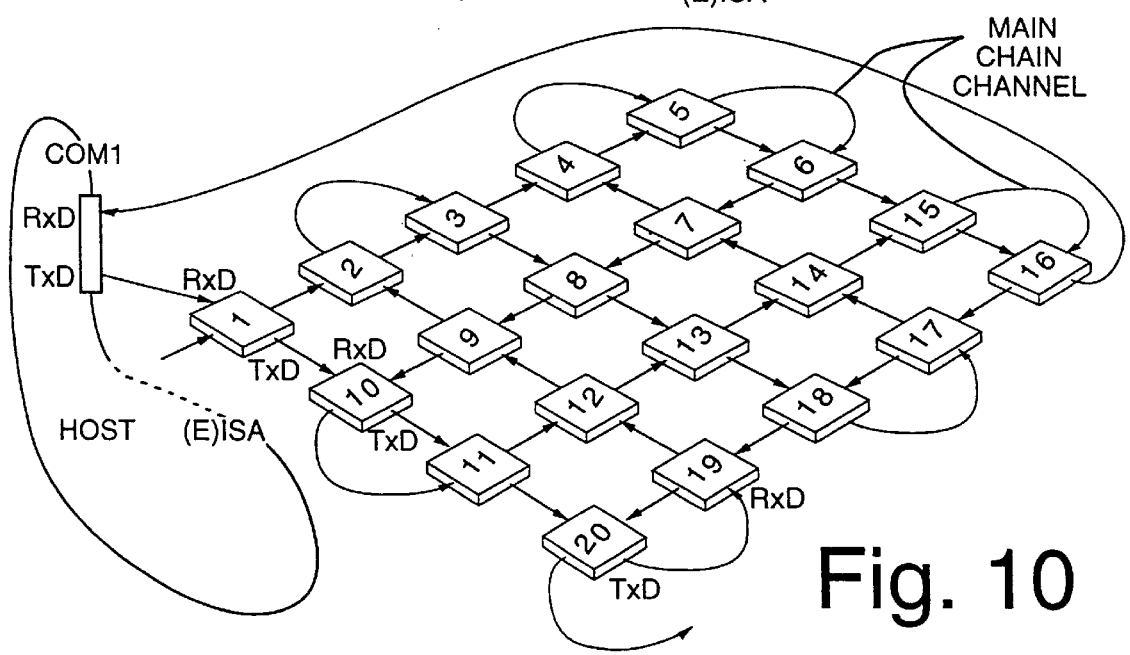
FIG. 10 illustrates an n-body of N/X-51 units spanned by two orthogonal channels in accordance with the present invention.

The problem is how to detect this proximity. There is no known general solution. This invention utilizes orthogonal channel(s) to provide a solution as depicted in FIG. 10 which shows an n-body array (4×5) of N/X-51 units spanned by two orthogonal channels.

The n-body array of twenty N/X-51 units is connected in a linear chain topology, that is, unit 1 is connected to unit 2 which is connected to unit 3, and so forth until unit 19 is connected to unit 20, all via the "main chain channel" consisting of shared dual port RAM plus bidirectional interrupts. In this implementation, the host communicates via the EISA bus interface with unit #1, the MASTER unit, which communicates with SLAVE unit #2, which communicates with SLAVE unit #3, etc. The establishment of this chain is as described previously using the "download while reset" and self ID enumeration and propagation procedures. The downloaded program can initially compute its own position in the chain based on its self-ID and upon an initial element-to-element distance. Thus each element can compare its "position" with that of its nearest neighbors, and determine what next step to take, based on whatever interaction between neighbors is assumed. Keep in mind that "position" need not necessarily be actual physical position of the unit, and may in fact be any assigned position. Moreover, the characteristic of inherent need not be position, it could be any other variable, such as temperature or pressure, etc. After each such action, there may be a change in an element's position (either absolutely or relative to its neighbor, or both) and thus a new interaction must be computed and responded to. In this fashion each element of the chain evolves in response to its nearest neighbors, and, through these, more distant neighbors. Thus for example, "displacement" of one element may first affect only its nearest neighbor, which may move in response to the displacement. This move will be detected by its nearest neighbor, which may then respond, and in this way, changes to one element may be felt by remote elements (after a propagation delay) even though there is never any direct communication between the remote element and the originally displaced element.

What happens if, after the machine has run for some time, the folding in 3-dimensional space has brought the initially displaced element and the remote element (for example) into close proximity? In the real world, close means strongly interacting, yet our model sees only weak interaction as described above, if it sees any interaction at all! (With finite resolution, we have, in effect, a noise level, or threshold beyond which changes will not propagate.) This is a real problem for linear chain models.

The present invention allows various approaches to this problem, of which only two are mentioned herein.

First, each element may be responsible for keeping track of the locations of all other elements in the chain, and thereby determining when any other element has moved into its neighborhood. An example algorithm to accomplish this might be:

Periodically (via timer interrupt, count background loops, etc.) transmit ones own address both upstream and downstream, using interrupts. For example, assume that the "N-command" has the following format:

N_command N_ID X_position Y_position Z_position time

Figure 11:
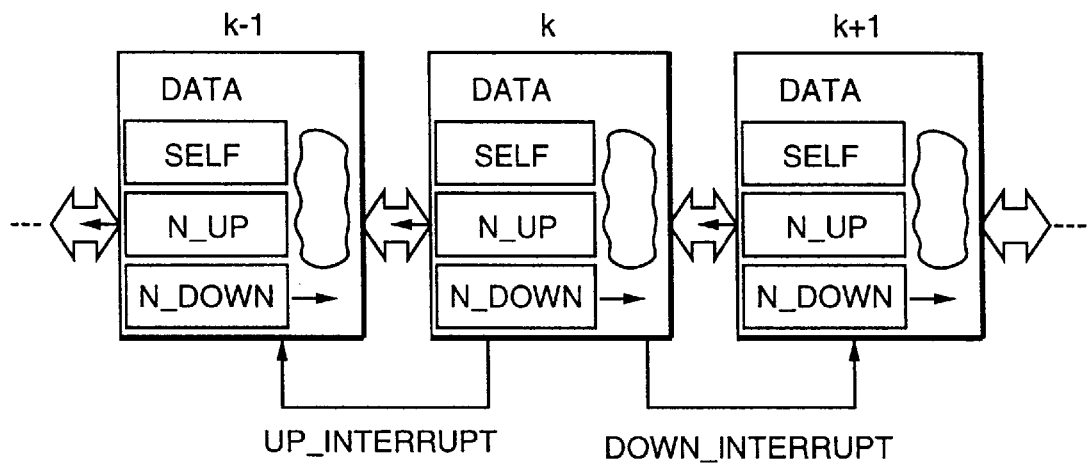
FIG. 11 is a diagram illustrating RAM space reservation for accommodating up and down interrupt data transfers.

Each N/X-51 unit will reserve enough dual-port RAM space for its neighbor upstream, and its neighbor downstream to transfer position messages to or from. FIG. 11 shows N-up and N-down: N-up is sent upstream, to lower numbered devices, while N-down flows downstream to higher numbered devices:

To illustrate, assume K has received an N-down message from K−1. K will handle this message (as will be seen later) and will also pass the message downstream to K+1. This is accomplished as follows: Device K, which has direct access to the dual port RAM belonging to its downstream neighbor will first copy the message into the N-down block of RAM reserved by device K+1 for this operation. Then device K will write the unique N-down command byte into the downstream interrupt location in K+1's data RAM. This will cause device K+1 to be interrupted. K+1 will read the interrupt location, thereby clearing the interrupt and retrieving the N-down command. K+1 then interprets the command to mean that new N-down data exists in its reserved block. This completes the downstream transfer. K+1 can now access the data, handle it as appropriate, and then copy it into K+2's N-down block of RAM and then interrupt device K+2. This continues until the message reaches the downstream end of the chain. In this fashion every downstream device will receive the position of the upstream device that began the procedure.

Now the upstream direction. Again, assume that K has received an N-up message from K+1. Device K will handle this message, as appropriate, and will also pass the message upstream to device K−1. Device K will simply write the N-up command byte into K's upstream interrupt location, thereby generating an upstream interrupt to device K−1. Device K−1 will read the upstream interrupt location (thereby clearing the upstream interrupt signal) and interpret the N-up command byte to mean that Device K's N-up block of RAM holds data. Since device K−1 has direct access to (downstream) device K, then K−1 will read the data from K's dual port RAM and copy it into its own N-up block of RAM. This completes the upstream transfer. Device K−1 will then handle the data appropriately, and then will interrupt device K−2 with an N-up command. In this way the N-up will be transferred upstream until it reaches the upstream end of the chain.

Thus, if every element in the chain periodically sends its own position (N-ID=self-ID) both upstream and downstream, then every element in the chain will receive every other elements position on a periodic basis. Note that semaphores or other techniques may be required to prevent collisions, but such methods are well known to one skilled in the art.

Thus, each element can be responsible for keeping track of the locations of all other elements in the chain, with the goal of determining when any other element has moved into the first element's neighborhood.

As described above, upon receipt of the N-position message, a device should "handle" the message. In general there are two ways to handle the message. Either the receiving element determines the N-ID of the incoming message, and copies all of the position information into the appropriate "N-slot" in an array of positions, for later analysis, or the receiving element immediately compares the incoming position to the element's own position, and determines at once whether or not the incoming position indicates that another element has moved into the receiving element's neighborhood. If not, then the incoming message can be discarded (after properly transmitting said message up or downstream, as appropriate). If so, then the implication is that folding of the chain has brought element (N-ID) and the receiving element into close proximity, and both of these elements should begin interacting.

This completes the first method of detecting folding in a chain, and determining which elements become neighbors as a consequence of the folding. There are disadvantages to this method however. For practical purposes, the longer the chain, the more utility one will expect from the system, as all real proteins tend to be very long indeed. This has several undesirable aspects. First, the length of the message (in bits or bytes) must grow merely to keep track of positions in a very long chain. For example, relative position in a 100- chain can be recorded in one byte, whereas at least three bytes are needed in a 100,000-chain. Second, if the position of each element is recorded in an array in dual port RAM the array will get very long. While at the time of application, Toshiba is discussing 256M bit RAM plus logic on a single chip, this solution is not yet available, and the initial X-51 has only 16 K-bits of data RAM. Third, increasing amounts of time (proportional to N) are required simply for message passing, thereby diminishing the time each element can spend dealing with its current nearest neighbors.

Thus, the problem of folding in a chain has been solved, but the solution has a number of drawbacks. Now consider the second, preferred, implementation designed to solve the folding problem in a chain. Recall the twenty N/X-51 units connected in a chain topology. From FIG. 10 it can be seen that the "main chain channel" connects units 1-2-3-4-. . . -17-18-19-20, thereby yielding a linear-chain, while the actual N/X-51 chain is folded several times, to yield four rows of five N/X-51 units. This folding of the devices occurs simply to fit more devices on a printed circuit board, and has no relation to the folding of the computational model chain that will be built using the physical chain of N/X-51 units. This point should be understood before proceeding. That is, even through the physical chain of N/X-51 processing units is folded, the connected chain has a linear topology, and the initialization procedure described earlier will distribute the computational model chain along a line beginning at position (self-ID=1) and extending to position (self-ID=20) in model-space.

With this understood, consider a second, orthogonal communications chain, based on the RS-232 bit serial communications channel. Note that one could tie the host TxD to the Master N/X-51 unit #1's RxD, then tie unit #1's TxD to unit #2's RxD, unit #2's TxD to unit #3's RxD, and so forth, providing a communication channel that topologically "parallels" the "main chain channel" described above. Instead, to emphasize the complete orthogonality of the two channels, we tie unit #1's TxD to unit #10's RxD, thence unit #10's TxD to unit #11's RxD, unit #11's TxD to unit #20's RxD, which then loops back from unit #20's TxD to unit #19's RxD, unit #19's TxD to unit #12's RxD, unit #12's TxD to unit #9's RxD and so on. While in a sentence, this appears non-sensical, we observe from FIG. 12 that we are simply running our RS-232 channel up and down columns in the 4 row by 5 col N/X-51 unit matrix in which the "main chain channel" is looped back and forth along rows. Of course, if one lengthened either the rows or the columns, the "main chain" could be kept connected linearly from the first to the last, but all of the RS-232 connections would be re-ordered, assuming that the same column based looping for RS-232 is retained. The looping behavior is easy to draw, and can be seen to provide "nearest neighbor" connections in physical space, thereby minimizing (and simplifying) the physical interconnections, either metalically via printed wiring assemblies or optically. The looping clearly spans the N/X-51 unit space; that is, all N/X-51 units will be connected in this fashion, with none left out. Finally, the "last" unit on the RS-232 (or other bit serial) channel has an uncommitted output port, TxD. This conveniently ties into the (unused) RxD port of the host processor, thereby closing the loop. Now to investigate possible applications of this loop.

The Folding Problem with Orthogonal Channels

Returning now to the folding problem, assume the N/X-51 units represent the amino acid building blocks of proteins. The "main chain channel" will perform nearest neighbor communications and interactions as before, but will not be used as previously described to transfer every element's position upstream and downstream to all other elements. Instead, the problem will be approached from a system perspective. For example, the host (assumed to be a Pentium or better) can send a request to each element via the RS-232 (bit serial) channel. The designated element will respond by transmitting its n-position message "down" the RS-232 chain until it reaches the host. All other elements simply pass the message along, with no storage or analysis. Unlike the "main chain channel" which is bi-directional, a single bit serial channel is uni-directional—all flows are "downstream".

How does this approach to the folding problem differ?

First, with the exception of recognizing when a command is for a device itself, all analysis is moved to the host. That is, devices no longer must compare their own position to all others. The host now does the comparison. This has numerous consequences. The host (a Pentium) is much more powerful than the X-51 (an 8051 equivalent power device) and it is expected that this will always be the case. That is, ten or twenty years from now, the X-51-type device will be vastly more powerful, but we expect that the host processor will have improved proportionately.

Thus, for example, if X-51 s are keeping track of folding, we expect them to do so at the maximum resolution, that is, at the same resolution used for nearest neighbor computations. The host, however, is faster and smarter, with more available data memory, and can be expected to apply more intelligent analysis. For example, the host may use a grosser scale, dividing the problem into larger regions of space, and ignoring elements that fall in (or out of) certain regions.

Similarly, the host may do more predictive analysis, measuring velocities, and using projected paths for closer observation. That is, based on current positions and velocities, the host may decide that some segments of the proteins (say) require more frequent attention, and other segments can be checked less frequently, thereby optimizing in some sense the use of the RS-232 (or bit serial) channel. This supports the earlier statement that orthogonal channels may even represent different scales.

In this sense also note that grosser time scales are appropriate to grosser position scales. In general the motion of a segment of protein is much slower than the motion of its constituent elements, therefore the use of the (generally) slower bit serial channel instead of the faster "main chain channel" is not a disadvantage, but is actually a more appropriate mapping of resources according to the characteristics of the physical problem being modeled.

Even so, the same problem of very long chains is present with the bit serial channel solution to the folding problem. There are two primary approaches to this problem. First, as indicated above, the host can use more predictive analysis to focus communication where it is most appropriate, thereby optimizing use of the channel. Second, one can throw more hardware at the problem. For example, instead of a single RS-232 corn port, the host may employ an Octal UART of the kind available from Cybernetic Micro Systems, Inc., as well as other manufacturers, such as Quatech.

Figure 12:
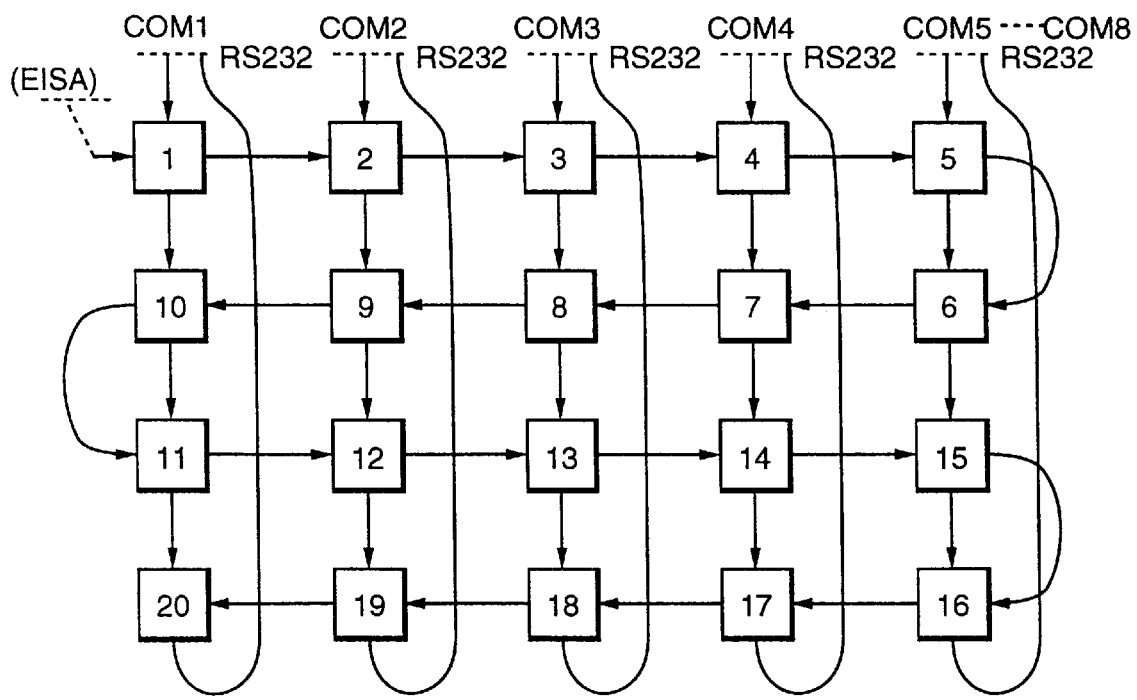
FIG. 12 illustrates array organization in accordance with the present invention.

To illustrate this solution on the same 4 row by 5 col matrix of N/X-51 units, using the eight port Octal UART at the host, one possible topology is shown in FIG. 12:

In this figure, five bit serial loops reduce the longest loop transit to one fifth of the original transit. That is, where originally a message had to flow through twenty processors before the host received a response, now the host receives the response after only four processor delays. (For clarity, note that it is the total path time that tends to be the problem. Each N/X-51 unit does most of the RS-232 communication in hardware concurrently with the "main chain" processing, thus the cost to each N/X-51 unit is minimal (but the delays are cumulative.)

Although bit serial loop transit times grow with the size of the chain, very little buffering per device is required to prevent collisions and allow the host to "keep the channel full". The host can "pipeline" requests to individual elements in the chain, addressing the next element before receiving the last elements reply, etc.

This illustrates how the intelligence of the host, combined with the (downloaded) X-51 code, and combined with additional communication hardware, can offer many ways to improve efficiency and optimize orthogonal channel use for very long chains. Many other such tradeoffs and schemes should immediately become apparent to those skilled in the art.

Orthogonal Channels as Control Channels

Most of the above discussion has centered on the use of bit serial channels orthogonal to the "main chain channel" (and to each other) for use in solving the folding problem for long chains.

However, no limit on the use of such channels is implied. For example, bit serial channels can be used not only to detect folding behavior, but as a general monitor channel collecting data for display purposes. While the "main chain" is cranking along at full speed to solve the problem of interest, one or more orthogonal channels can be collecting data for real time display.

These channels can also be used as input channels to the system, providing a path for either stimuli or constraints to be entered into the system in real time, based either on human responses to displayed status or on host computed responses to observed status of the system.

As described in the initialization procedure, all N/X-51 units in the chain initially receive the same code (via the "download while reset"). After the complete chain has been initialized, it is possible to vary the code in an X-51 specific fashion. This can be achieved via either self modifying code or via secondary downloading from the host over an orthogonal channel such as a bit-serial channel.

Alternatively, each N/X-51 unit in the chain can be downloaded with identical code (the normal procedure) and the orthogonal channel(s) can be used by the host to download unit specific data, that will provide each unit with (possible) unique initial conditions.

Generalized Orthogonal Channels

An X-51 or N-Body "channel" exists when an input port on the N/X-51 unit is compatible with an output port, thereby allowing the output of an upstream device to communicate with the input of the next downstream device. This channel provides a means of sequentially communicating with all of the devices in a chain or array. If two channels are independently implemented, then they are orthogonal. Channels, by definition, imply hardware, since they couple the signals originating outside a device to the code executing inside a device. While the most useful channels tend to be based on interrupt hardware, it is possible to implement a channel using I/O port POLL'ing in a background loop.

Figure 13:
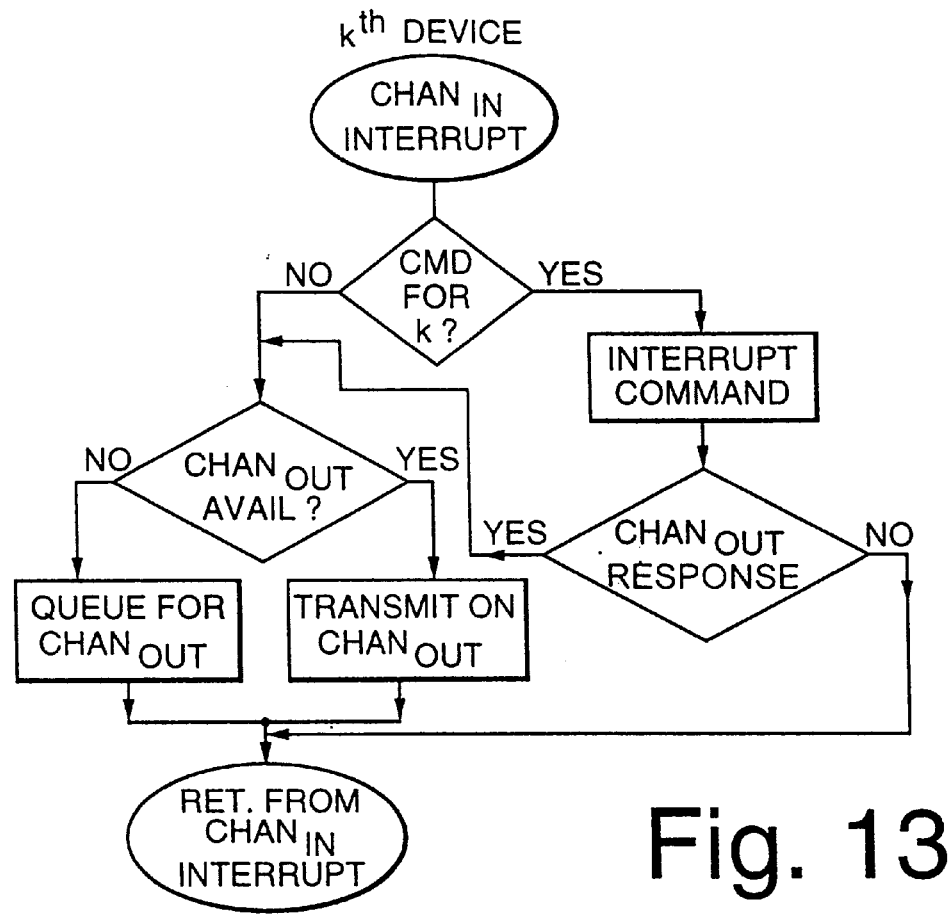
FIG. 13 is a flow chart illustrating I/O port POLLing in accordance with the present invention.
Figure 14:
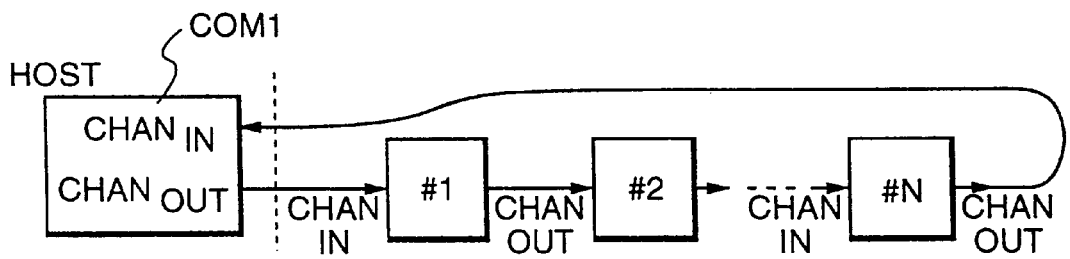
FIG. 14 is a block diagram illustrating orthogonal channels originating and terminating at the host.

Because of the POLLing option, the actual number of channels existing in an array or chain may be indeterminate, and can in fact change over time, depending upon the specific code downloaded. For simplicity, consider interrupting channels in the following manner. A channel through the Kth device is shown in FIG. 13:

The receipt of a message from an upstream device occasions an interrupt in the local device (#K) and the interrupt service routine tests to determine whether the message is intended for device K. If so, then the message is decoded, or interpreted, and an appropriate response is elicited from K. Although the message may terminate at K (for instance, device specific data initialization messages) the general procedure will involve transmitting a result on the corresponding output channel to down stream devices, either to be used by these devices, or by the host, which typically terminates the channel. FIG. 14 illustrates Orthogonal Channels typically originating and terminating at the host.

Note that hardware input and output means are necessary but not sufficient for a channel to exist through the N/X-51 unit. Software implementing the procedures shown in FIG. 13 is required. This software can be built into ROM or can be downloaded as described earlier.

Multiple Orthogonal Channels

Figure 15:
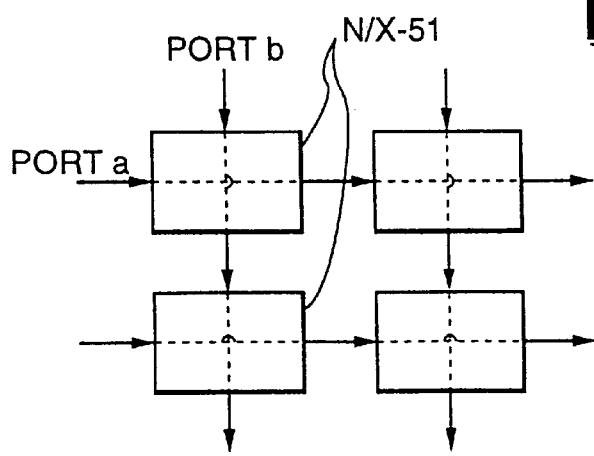
FIG. 15 illustrates the use of an array of N/X-51 units to implement multiple orthogonal channels.

Although the initial N/X-51 unit implementation supports only one RS-232 channel, general purpose 8051 derivatives exist with two RS-232 communication ports. As suggested in FIG. 15, future N/X-51 versions could implement two RS-232 ports per device, thus facilitating 2-D arrays. In fact, each orthogonal channel extends the dimensionallity of the system by one.

Microcomputers such as the 8051 and its equivalents often contain special purpose hardware not common in general purpose CPUs such as the Pentium. Examples of such hardware include: DMA channels, Analog support (Analog IN via [multiple] A/D converters, and Analog OUT via [multiple] D/A converters.), RS-232 communication channels, I2C comm channels, Interrupting Input Pins, Chip Select Input pins, Bi-directional I/O pins, counter/timer hardware (with input and/or output pins and interrupt support), etc. All of these inputs, when matched with a corresponding output and with channel support software, yield preferred implementations of X-51 orthogonal channels.

Networks of N/X-51 Devices

Figure 16:
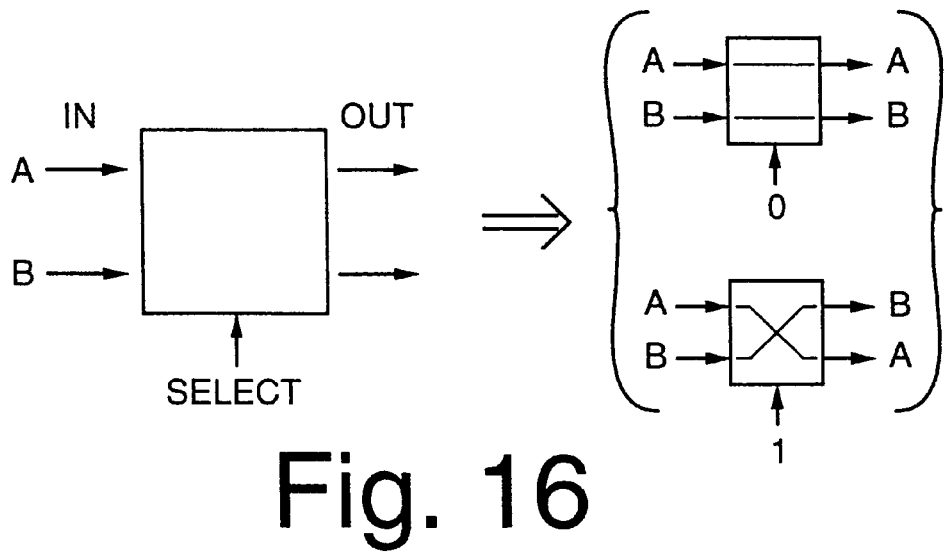
FIG. 16 shows that orthogonal channels may be selectively re-routed in accordance with the present invention.

Having developed the downloadable support for channels, it is noted that both analog and digital "crossbar" switches are available commercially. These switches possess multiple inputs and multiple outputs, and the control circuitry capable of switching connecting paths from any input to any output. A simple two input, two output switch is shown in FIG. 16:

Via the addition of such switches to a system of N/X-51 devices, any of the orthogonal channels can be re-routed in a very general fashion, thereby allowing networks of N/X-51 units to be constructed with far greater complexity than the simple linear chain topology. Control of the switches can be from the host or from N/X-51 devices in the net, allowing adaptive network connectivity.

Non-metallic Channel Connections

Figure 17:
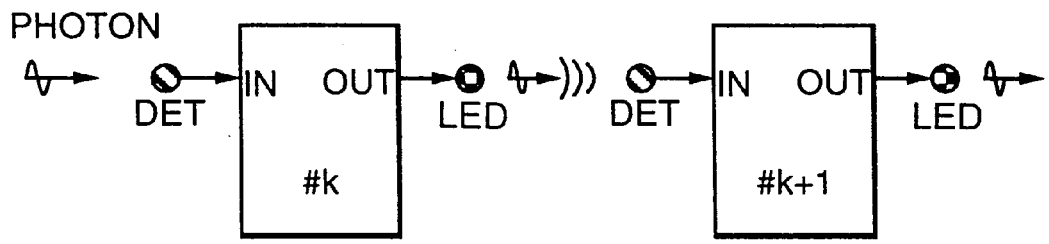
FIGS. 17 and 18 illustrate the use of photo couples to connect N/X-51 units in accordance with the present invention.

While most of the preceding discussion considers the N/X-51 downstream units to be connected to upstream units either directly via wiring, or indirectly, via switches, all of the main features of the present invention will be preserved if the wires are broken and suitable transducers are interposed as suggested by FIG. 17. Note that in most cases, unidirectional communications are sufficient. Thus, for example, if an opto source such as a Light Emitting Diode (LED) is driven by the output channel signal pin, then an optical detector would drive the corresponding input channel.

Figure 18:
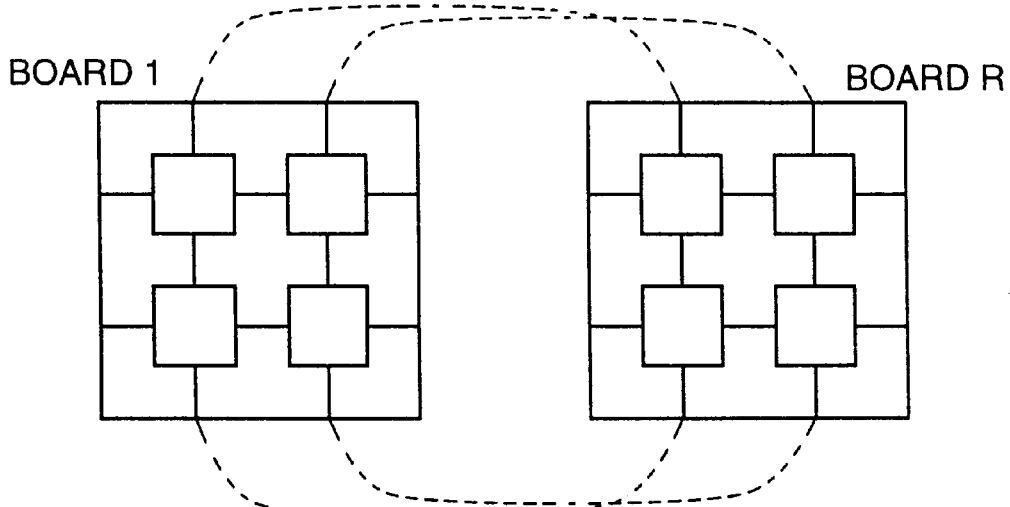

The primary use of photo-coupling is to extend the array or network into 3-D space, for example, to connect corresponding devices on a board M to those on a board M+1, thereby allowing 'planes' of N/X-51 arrays to be 'stacked' as illustrated in FIG. 18.

Simultaneous Startup of Chain Elements

Figure 19:
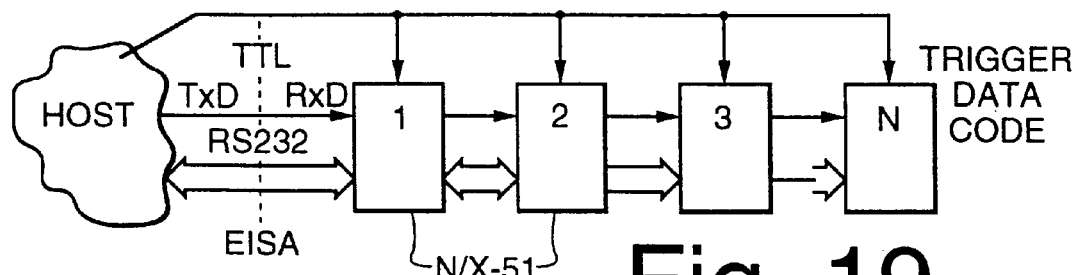
FIG. 19 illustrates how the units in a chain may be simultaneously started in accordance with the present invention.

In some cases it may be desirable to hold off operation of all N/X-51 processors until the initial (data) conditions have been downloaded. This can be achieved via a common trigger line implemented using one of the N/X-51 unit's general purpose I/O lines, (say port P1.0), as shown in FIG. 19.

This example shows how the N/X-51 units differ from special purpose multiprocessor units in that they are based on a general purpose micro computer such as the 8051 or equivalent, with one or more UARTs, one or more counter/timer circuits, one or more interrupt lines, and several general purpose I/O lines, all of which are under program control, and most or all of which can be used for inter-chip communication/coordination.

Chip Selection for Tree Topology Models

Figure 20:
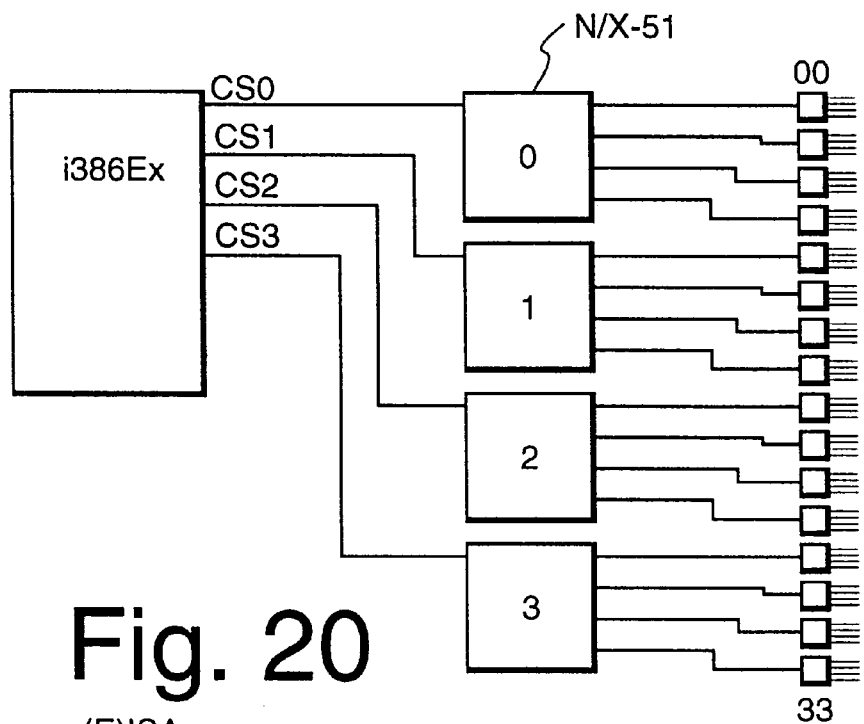
FIG. 20 illustrates how the present invention may be used to implement tree topology models.

In addition to the architectural features discussed previously, the RX-51 unit possesses a chip select input. Chip selects are common on peripheral devices. Because most processor designs have included a single processor with a single bus and many peripheral devices, the chip select input allowed many devices to be connected simultaneously to the single bus, sharing both data lines and Read and Write control strobes. Typically depending upon decoded addressing, only one chip select line should be active at any given time. This line would enable the selected peripheral chip for reading or writing data to the bus. All other devices would be disabled, ignoring both data, Rd, and Wr. FIG. 20 shows how the N/X-51 unit with chip select can be used in a tree architecture to implement four-in/four-out features.

Linear-to-Ring Configurational Evolution

Figure 21:
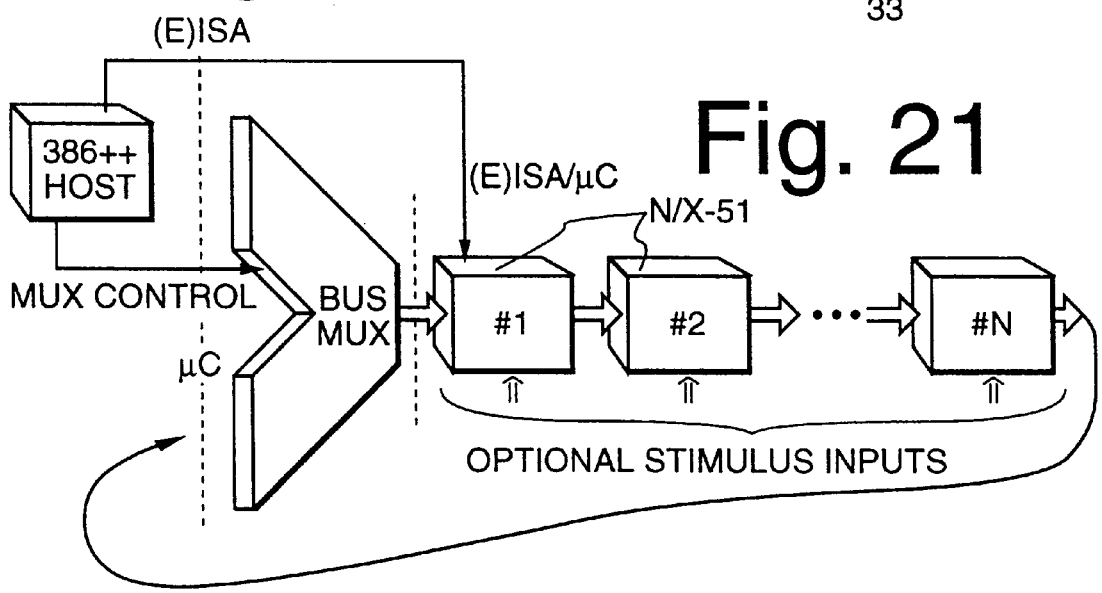
FIG. 21 illustrates a ring network using N/X-51 units in accordance with the present invention.

FIG. 21 illustrates one way in which a "ring" network can be constructed using N/X-51 units. In the depicted example a string of 1, 2 . . . n N/X-51 units are selectively coupled to a host computer in open ended, or in ring configuration through use of a bus mux. In this example:

1.) Host switches N/X-51 unit #1 to EISA mode
2.) Host switches "Bus Mux" to EISA mode
3.) Host resets N/X-51 unit #1 (thereby resetting all N/X-51 units)
4.) Host programs unit #1
5.) Unit #1 program propagates down chain of N/X-51 units
6.) Host determines how that chain is programmed
7.) Host switches "Bus Mux" to uC mode, thereby connecting output of unit #n to input of unit #1
8.) Relaxation processes can be modeled, including . . . (numerous well known examples)
9.) Host uses orthogonal channels (RS-232, I2C,etc.) to monitor/control the Ring of N/X-51 units.

Although most of the example implementations and problems mentioned above have discussed long chain polymers such as DNA and proteins, it is believed that the N/X-51 architecture also offers advantages to economic models, stock market models, ecology models, digital circuit simulation, image encoding, encryption, any Markov process, tree searches, and many other fields of application, some of which may find special purposes for orthogonal channels.

Because a discussion of each field of application is generally necessary before showing the applicability of the invention to that field, it is beyond the scope of this application to do such. However, it is believed that the novelty and utility of the N/X-51 N-Body architecture will be immediately evident to practitioners working in these and other fields dealing with many body problems.

Cellular Applications of N/X-51 Architecture

Most of the discussion above has considered the basic microprocessor unit as an integrated circuit unit or "chip". While this invention is quite useful as a chip implementation, it may be even more useful where implemented as a "cell", in an array of cells implemented within a single integrated circuit device. This is particularly true in light of recent "DRAM plus LOGIC" offerings from Toshiba, Samsung and others. Because integrated circuit densities have reached the point at which Giga-bit memories are being designed, that is, integrated circuit memory devices containing 1,000,000,000 or more bits, the memory manufacturers have begun to investigate embedding logic circuits within the memory chips. According to the Jul. 28, 1997 issue of *Electronic Engineering Times,* page 1, "most major DRAM players, such as Mitsubishi, Samsung, and Toshiba, are now steeped in embedded-DRAM development". The article discusses an embedded-DRAM device designated by OAK that will be built by Sony.

The Oak/Sony device is a CD ROM controller, and is typical of the first dedicated circuits that will be built using embedded-logic-in-DRAM technology. Aside from specific dedicated devices, there arises the question of the appropriate general architecture best suited for logic-in-RAM devices. The present invention offers several features that are very well suited to such devices. In particular:

Regular array topology
Minimal i/o pin requirements
No significant clock skew problems
Maximum flexibility via downloaded code
Well behaved start-up procedures
Unlimited expansion via chip concatenation
Completely general microprocessor architecture
Flexible logic-to-DRAM ratios
Well suited to current manufacturing technologies
Capable of scaling nicely as densities increase
Orthogonal channels well suited to DRAM layout, etc.

These points will be discussed in terms of the Basic Cell shown in FIG. 22.

Regular Array Topology

The N/X-51 architecture is designed to link discrete integrated circuit microprocessor unit cells, as depicted in FIG. 22, into a very regular chain topology. FIGS. 10 and 12 discussed above, generally emphasize this feature.

The illustrated N/X-51 "Cell" architecture of FIG. 22 also specifically shows the I/O channel "wiring" traces associated with the basic cell, such wiring being quite common on integrated circuit layouts, and being ideally suited for interconnnections between orthogonal I/O channels of different cells, as suggested in FIGS. 23a and 23b. In these Figures, a 6-cell implementation of N/X-51 cells with a typical orthogonal I/O channel interconnection scheme is depicted in block diagrammatic form in FIG. 23a and in quasi-schematic form in FIG. 23b. Note that external I/O pin requirements are fixed.

Minimal I/O Requirements

A significant problem that tends to increase with density concerns I/O requirements. As increasing chip densities allow more circuitry to be built on a single chip, the additional circuitry very often requires more input and output channels, and these imply more I/O pins. For example, a field programmable gate array (FPGA) used to prototype the 8051 implementation of the present embodiment, requires 503 pins for I/O although only 60 pins were required by the 8051.

As shown below, the I/O pin requirements are determined primarily by the size of the upstream input channel and the downstream output channel plus the orthogonal I/O channels, regardless of the number of cells!

No Significant Clock Skew Problems

Most current high density circuits are synchronous systems, with all circuits clocked by a common clock. Since clock rates tend to increase strongly with decreasing I/C line widths (increasing density), the corresponding clock periods decrease. Thus, if clock buffering is required, the inherent delay of the buffer represents a non-negligible percentage of the clock period, and therefore the buffered clock signal is "skewed" with respect to the original clock signal. In a synchronous system, "skew" is bad.

In an array of N/X-51 cells, each cell buffers the clock, and the buffered clock is then fed to the next cell, thereby accumulating the skew. In a synchronous system, this would quickly become catastrophic, however, in the N/X-51 array, although N/X-51 cell is synchronous, the connectors between cells are asynchronous, being limited to multiport memory accesses and interrupt signals, which are both asynchronous connectors. Thus, a major problem disappears.

Maximum Flexibility via DownLoaded Code

Including code on an integrated circuit is often disadvantageous. First, if any undiscovered bugs exist, they may be of such seriousness that all of the manufactured devices must be discarded and/or replaced. Second, even bug-free code tends to have short lifetimes as the markets constantly demand new features, etc.

Downloading code solves both of these problems. If bugs are found, they can be fixed, and the new code can be downloaded into the old devices, instead of discarding them. Similarly, demand for new features can often be met with a new version of the downloaded code.

In the past, code distribution has typically been via floppy disk, etc., however, present and future trends make it probable that new code distribution via the Internet will make N/X-51 arrays even more flexible due to ease of distribution of downloaded code.

Well-Behaved Startup Procedures

As described above, the most upstream processor is reset by the host, and the reset "ripples" down the chain until all devices have been reset. Each reset device is held in reset by their next upstream neighbor until such time as that neighbor releases it. Because the upstream neighbor can execute any appropriate code before releasing its downstream neighbor, the upstream device is free to establish any appropriate initial conditions by writing into the downstream devices multiport memory before releasing it from reset.

The startup procedure therefore offers maximum flexibility, while guaranteeing a well behaved startup.

Unlimited Expansion Via Chip Concatenation

Regardless of the number of cells implemented on a single chip, the N/X-51 array is basically unlimited in size due to the ability to concatenate chips. As shown in the 6-cell chips of FIGS. 23a and 23b, it is only necessary that the upstream interface of the most upstream cell in the chip and the downstream interface of the most downstream cell in the chip be brought out to I/O pins. This is sufficient for interfacing two chips together and thereby doubling the size of the N/X-51 array. Of course, the last cell of the last chip in the array should have its reset output pin tied to ground, to indicate the end of the chain If it should ever be necessary to use only a fraction of the N/X-51 array within a given chip, then at least the reset output of the desired terminal N/X-51 must be brought out, and for generality, all cell reset outputs should be made available. That is, if it is assumed that only five N/X-51 cells are desired but that the chips contain six N/X-51 cells, it is necessary that the reset out of the fifth cell be available for gounding. Whenever any downstream cell determines that its reset is grounded, it automatically becomes the last cell in the chain, and any remaining cells are ignored. Note that if such fractional array selection is desired, it may be necessary to provide a means for holding the remaining cells reset.

Completely General Microprocessor Architecture

Although the first implementation of the N/X-51 was based on the Intel 8051 architecture, there are absolutely no constraints on the local processor architecture except those stated herein. In particular, the address and data busses may be of any width, the multiport memory may be of any length (compatible with address bus) and the number of orthogonal I/O pairs may be of any number.

There may or may not be internal register files included in the local processor, there may be any number of interrupts (beyond the minimum number stated herein) and there are absolutely no constraints on the instruction set (assuming "completeness" however).

This almost total freedom of processor architecture allows special purpose architecture to be implemented which retains all of the desirable features of the N/X-51 array while optimizing for particular problems, and/or applications.

Flexible Logic-to-RAM Ratios

Because the N/X-51 is designed as a general purpose device, it is difficult to specify the "correct" amount of memory per cell. Therefore, it may be reasonable to simply choose memory size such that the actual physical layout of the cell is optimized, providing some measure of efficiency.

Well Suited to Current Manufacturing Technologies

Because the major components of the N/X-51 are multiport memory, processor architecture, and associated busses and I/O pins, and such devices have been manufactured in discrete form for two decades, the N/X-51 cell is well suited for implementation using current manufacturing technologies.

Capable of Scaling Nicely as Densities Increase

Because of several of the above features, regularity of array, flexibility of logic/DRAM ratio, and fixed number of I/O pins independent of the number of cells per chip, and because clock skew is not a problem, and because of the well behaved startup procedure, the N/X-51 should scale beautifully as densities increase. In particular, one can simply pack more cells into a chip, or one can increase the memory per cell, or increase data bus widths, or increase the complexity of the processor architecture, etc.

What I claim:

1. A microprocessor unit for connection between means forming an upstream input channel for communicating address and control signals and including a first bi-directional data bus, and means forming a downstream output channel for communicating address and control signals and including a second bi-directional data bus, said microprocessor unit comprising:

a multiport memory means having at least a first port and a second port, said first port being connectable to said upstream input channel;

local processor means coupled to said second port and having a third port, said third port being connectable to said downstream output channel, said local processor means being capable of reading from and writing to an external memory through said third port; and interface means associated with said first port for selectively bringing said input channel into congruence with said output channel, whereby a plurality of said units can be linked together, with said first port being connectable to either a host computer or an upstream unit through the upstream input channel and said third port being connectable to a downstream unit through the downstream output channel.

2. A microprocessor unit as recited in claim 1 wherein said interface means renders said input channel congruent with a standard communications bus.

3. A microprocessor unit as recited in claim 1 wherein said input channel includes an address bus and a data bus, and said interface means includes a latch controlled by a latch enable signal, said latch being operable to selectively latch said data bus to said address bus so as to render said input channel congruent with said output channel.

4. A microprocessor unit as recited in claim 3 wherein said local processor means includes means for executing programs stored in said multiport memory means.

5. A microprocessor unit as recited in claim 4 wherein said local processor means includes means for receiving an upstream reset input signal and means for generating a downstream reset output signal, said upstream reset input signal being under external control, said downstream reset output signal being activated when said local processor means is reset, said downstream reset output signal being under control of program means associated with said local processor means, said program means being inhibited while said local processor means is reset.

6. A microprocessor unit as recited in claim 5 wherein said downstream reset output signal can be overridden by external control, and said local processor means is operative to detect said over-ridden downstream reset output signal.

7. A microprocessor unit as recited in claim 1 wherein said local processor means includes means for receiving a downstream generated interrupt input signal and an upstream generated interrupt input signal, said upstream generated interrupt input signal being coupled to said processor means via said upstream input channel.

8. A microprocessor unit as recited in claim 1 wherein in response to the writing by said local processor means of data into a particular address in said multiport memory means, said multiport memory means generates an upstream interrupt output signal.

9. A microprocessor unit as recited in claim 1 wherein said local processor means is responsive to an external clock signal and includes buffering means for generating a buffered clock output signal.

10. A microprocessor unit as recited in claim 1 wherein said multiport memory means includes means for resolving contentions between input signals applied to said first and second ports and for generating, in response thereto, a wait signal for output signal via said upstream input channel.

11. A microprocessor unit as recited in claim 1 wherein said local processor means includes at least one orthogonal input/output channel pair, such that for each orthogonal input channel of said pair, a corresponding orthogonal output channel exists, said corresponding orthogonal input and output channels being programmably coupled together.

12. A microprocessor unit as recited in claim 11 wherein said local processor means includes multiple interrupt means, at least one of said orthogonal input channels being coupled to said interrupt means.

13. A microprocessor unit as recited in claim 12 wherein at least one of said channel pairs includes an analog input channel and a corresponding electrically compatible analog output channel, and wherein said analog input channel is coupled to threshold detection means for generating an interrupt.

14. A microprocessor unit as recited in claim 12 wherein at least one of said channel pairs comprises an asynchronous digital serial input channel and a corresponding compatible asynchronous serial output channel.

15. A microprocessor unit as recited in claim 12 wherein at least one of said channel pairs includes an optical output channel and a corresponding compatible optical input channel, and wherein said optical input channel is coupled to associated interrupt generating means.

16. An array of inter-connected microprocessor units including at least one upstream microprocessor unit coupled to at least one downstream microprocessor unit, said upstream microprocessor unit being connectable to means forming an upstream input channel for communicating address and control signals and including a first bi-directional data bus, and said downstream microprocessor unit being connectable to means forming a downstream output channel for communicating address and control signals and including a second bi-directional data bus, each said microprocessor unit comprising:

a multiport memory means having at least a first port and a second port, said first port being connectable to an upstream microprocessor unit or an upstream input channel;

local processor means coupled to said second port and having a third port, said third port being connectable to a downstream microprocessor unit or a downstream output channel, said local processor means being capable of reading from and writing to an external memory through said third port; and interface means associated with said multiport memory means for bringing an associated upstream input channel or output of an upstream microprocessor unit into congruence with an associated downstream output channel;

each said unit having its first port coupled via said interface means to either an upstream input channel to the array or to an upstream microprocessor unit, and its third port configured as a downstream terminus or coupled to a downstream microprocessor unit.

17. An array of interconnected microprocessor units as recited in claim 16 wherein said means associated with said input channel renders said input channel congruent with a standard communications bus.

18. An array of interconnected microprocessor units as recited in claim 16 wherein said input channel includes an address bus and a data bus, and said last named means includes a latch controlled by a latch enable signal and is operable to selectively latch said data bus to said address bus so as to render said input channel congruent with said output channel.

19. An array of interconnected microprocessor units as recited in claim 18 wherein each said local processor means includes means for executing programs stored in an associated multi-port memory means.

20. An array of interconnected microprocessor units as recited in claim 19 wherein each said local processor means includes means for receiving an upstream reset input signal and means for generating a downstream reset output signal, said upstream reset input signal being under external control, said downstream reset output signal being activated when said local processor means is reset and said downstream reset output signal is under control of program means associated with said local processor means, said program means being inhibited while said local processor means is reset.

21. An array of interconnected microprocessor units as recited in claim 20 wherein said downstream reset output signal can be overridden by external control, and said local processor means is operative to detect said overridden downstream reset output signal.

22. An array of interconnected microprocessor units as recited in claim 16 wherein each said local processor means includes means for receiving a downstream generated interrupt input signal and an upstream generated interrupt signal, said upstream generated interrupt input signal being coupled thereto via said upstream input channel means.

23. An array of interconnected microprocessor units as recited in claim 16 wherein in response to the writing by a local processor means of data into a particular address in an associated multiport memory means, said multiport memory means generates an upstream interrupt output signal.

24. An array of interconnected microprocessor units as recited in claim 16 wherein each said local processor means is responsive to an external clock signal and includes buffering means for generating a buffered clock output signal.

25. An array of interconnected microprocessor units as recited in claim 16 wherein each said multiport memory means includes means for resolving contentions between input signals applied to said first and second ports and for generating in response thereto, a wait signal for output signal via said upstream input channel means.

26. An array of interconnected microprocessor units as recited in claim 16 wherein each said local processor means includes at least one orthogonal input/output channel pair, such that for each input channel of said pair, a corresponding output channel exists, said local processor means further including means selectively coupling corresponding input and output channels.

27. An array of interconnected microprocessor units as recited in claim 26 wherein each said local processor means includes multiple interrupt means, at least one of said input channels being coupled to said interrupt means.

28. An array of interconnected microprocessor units as recited in claim 27 wherein at least one of said channel pairs includes an analog input channel and a corresponding electrically compatible analog output channel, and wherein said analog input channel is coupled to threshold detection means for generating an interrupt.

29. An array of interconnected microprocessor units as recited in claim 27 wherein at least one of said channel pairs comprises an asynchronous digital serial input channel and a corresponding compatible asynchronous serial output channel.

30. An array of interconnected microprocessor units as recited in claim 27 wherein at least one of said channel pairs includes an optical output channel and a corresponding compatible input channel, and wherein said optical input channel is coupled to associated interrupt generating means.

31. An integrated circuit device comprising:
   first connector means for connection to an upstream input channel for communicating address and control signals and including a first bi-directional data bus;
   second connector means for connection to a downstream output channel for communicating address and control signals and including a second bi-directional data bus;
   circuit means for communicating address, data and control signals;
   a first processor cell including
      first multiport memory means having at least a first port and a second port,
      first interface means for coupling said first port to an upstream input channel via said first connector means and for bringing said upstream input channel into congruence with a downstream output channel, and
      first local processor means coupled to said second port and having a third port, said first local processor means being capable of reading from and writing to an external memory through said third port; and
   a second processor cell including
      a second multiport memory means having a fourth port and a fifth port,
      second interface means for coupling said fourth port to said third port via said circuit means and for bringing said circuit means into congruence with said downstream output channel, and
      second local processor means coupled to said fifth port and having a sixth port coupled to the downstream output channel via said second connector means.

32. An integrated circuit device as recited in claim 31 wherein said circuit means includes a plurality of additional processor cells linked together between said third port and said fourth port.

33. An integrated circuit device as recited in claim 32 wherein at least some of said processor cells include at least one orthogonal input/output channel pair, and wherein said integrated circuit device further comprises means forming orthogonal input/output channel interconnects for interconnecting at least some of said processor cells.

34. An integrated circuit device as recited in claim 32 wherein the connections between cells are asynchronous.

35. An integrated circuit device as recited in claim 34 wherein said connections are limited to multiport memory accesses and interrupt signals.

36. An integrated circuit device as recited ion claim 32 wherein said plurality of additional processor cells are connected in series to form a chain.

37. An integrated circuit device as recited in claim 36 wherein the local processor means of each said cell includes means for receiving an upstream generated reset input signal and means for generating a downstream reset output signal where an upstream reset input signal is asserted.

38. An integrated circuit device as recited in claim 37 wherein the reset output signal of said second processor cell is tied to device ground.

39. An integrated circuit device as recited in claim 38 wherein the resetting of said first local processor means causes a sequential resetting of all downstream cells and allows program code to be downloaded into said first cell, whereupon a subsequent release of said first cell from reset causes said first processor means to begin executing the downloaded program code.

40. An integrated circuit device as recited in claim 39 wherein said downloaded program code is operative to cause said first processor means to test its output reset signal to determine whether or not it has been overridden by external means, and if said output reset has not been overridden, said first processor means is operative to cause a copy of said program code to be downloaded to the next downstream cell while it is in reset and to complete execution of said program code.

41. An integrated circuit device as recited in claim 40 wherein following completion of the download of said program code to the next downstream cell, said first processor means accesses a value from a predetermined location in said first memory means, increments the value by one, writes the incremented value into a corresponding location in the memory means of the next downstream cell, and releases said next downstream cell from reset.

42. An integrated circuit device as recited in claim 41 wherein said downloaded code causes each downstream cell to sequentially repeat the recited operation until said program code is copied into said second processor cell, and during execution thereof determines that its reset output signal is overridden, thereby indicating that said second processor cell is the most downstream cell, whereupon the downloaded program code causes said second processor means to read the value stored in said predetermined location in said second memory means, to copy the stored value into a second predetermined location in said second memory means, then cause a program specified value to be written into a third predetermined memory location thereby causing said second memory means to generate an upstream output interrupt that is coupled to the next upstream processor cell.

43. An integrated circuit device as recited in claim 42 wherein any processor cell in the chain, having been interrupted by an interrupt output generated by its next downstream processor cell, accesses the value stored in said third predetermined location of the downstream cells multiport memory means, and checks to see if it is the program specified value, and if so, the processor cell accesses the value stored in said second predetermined location of the downstream cells multiport memory means, and copies such value to a corresponding second predetermined location in its own memory means, then causes an upstream output interrupt to be generated.

44. An integrated circuit device as recited in claim 43 wherein upon having passed said incremented values downstream by storage in the memory means of each processor cell and having passed the value stored in the second predetermined location of said second processor cell upstream by sequential storage at the second predetermined location in the memory means of each upstream processor cell, each cell will continue to execute its downloaded program code using the stored incremented value of each processor cell as a unique cell identifier and using said second value as an indicator of chain length.

45. An integrated circuit device as recited in claim 44 wherein at least some of said processor cells include at least one orthogonal input/output channel pair, and wherein said integrated circuit device further comprises means forming orthogonal input/output channel interconnects for interconnecting at least some of said processor cells, and wherein interrupts from orthogonal input channels can access said unique identifier and other data in an interrupting multiport memory means as determined by a program code received from an upstream processor cell and can output appropriate data on said corresponding output channel of the orthogonal input/output pair.

46. A microprocessor unit comprising:

first terminals for connection to an upstream input channel for communicating address and control signals;

a multiport memory having at least a first port and a second port;

an interface circuit including
  a first bus having a first plurality of signal lines for communicating "Hi" address bits between said first terminals and said first port and a second plurality of signal lines for communicating "Lo" address bits between said first terminals and said first port,
  a second bus having a third plurality of signal lines for communicating data bits between said first terminals and said first port, and
  a latch responsive to a latch enable signal and operative to selectively latch said second plurality of signal lines to said third plurality of signal lines so as to cause said interface to have a selected one of two possible interface states;

second terminals for connection to a downstream output channel;

a local processor coupled to said second port and having a third port communicatively coupled to said second terminals for communicating address and control signals;

whereby in response to a latch enable signal said interface is caused to assume one of said two states so as to bring the upstream input channel into congruence with the downstream output channel.

47. A microprocessor unit as recited in claim 46 and further comprising a first reset line connected between said first terminals and a reset input to said local processor, and a second reset line connected between said third port and said second terminals, said local processor being responsive to a reset signal asserted on said first reset line and operative to generate a reset signal on said second reset line.

48. A microprocessor unit as recited in claim 46 wherein said local processor includes at least one orthogonal input/output channel pair, such that for each orthogonal input channel of said pair, a corresponding orthogonal output channel exists, said corresponding orthogonal input and output channels being programmable coupled together.

* * * * *